(12) United States Patent  
Wachter

(10) Patent No.: US 7,456,123 B2
(45) Date of Patent: Nov. 25, 2008

(54) FCC CATALYST

(75) Inventor: William A. Wachter, Flemington, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 374 days.

(21) Appl. No.: 11/106,297

(22) Filed: Apr. 14, 2005

(65) Prior Publication Data

US 2005/0272593 A1   Dec. 8, 2005

Related U.S. Application Data

(60) Provisional application No. 60/577,748, filed on Jun. 8, 2004.

(51) Int. Cl.
    *B01J 29/06* (2006.01)
(52) U.S. Cl. ............... 502/60; 502/63; 502/64; 502/68; 502/79
(58) Field of Classification Search ............ 502/60, 502/63, 64, 68, 79
    See application file for complete search history.

(56) References Cited

U.S. PATENT DOCUMENTS

| 3,496,116 | A |   | 2/1970  | Anderson et al. |         |
|-----------|---|---|---------|-----------------|---------|
| 3,702,886 | A |   | 11/1972 | Argauer et al.  |         |
| 3,709,979 | A |   | 1/1973  | Chu             |         |
| 3,770,614 | A |   | 11/1973 | Graven          | 208/62  |
| 3,832,449 | A |   | 8/1974  | Rosinski et al. |         |
| 3,948,758 | A |   | 4/1976  | Bonacci et al.  | 585/474 |
| 4,016,245 | A |   | 4/1977  | Plank et al.    |         |
| 4,076,842 | A |   | 2/1978  | Plank et al.    |         |
| 4,229,424 | A |   | 10/1980 | Kokotailo       | 502/64  |
| 4,254,297 | A |   | 3/1981  | Frenken et al.  | 585/640 |
| 4,310,440 | A |   | 1/1982  | Wilson et al.   | 502/208 |
| 4,440,871 | A |   | 4/1984  | Lok et al.      | 502/214 |
| 4,465,780 | A |   | 8/1984  | Pine            | 502/68  |
| 4,500,651 | A |   | 2/1985  | Lok et al.      | 502/208 |
| 4,968,405 | A |   | 11/1990 | Wachter         | 208/120 |
| 5,110,776 | A |   | 5/1992  | Chitnis et al.  | 502/64  |
| 5,221,648 | A | * | 6/1993  | Wachter         | 502/68  |
| 6,214,211 | B1| * | 4/2001  | Itoh            | 208/118 |
| 6,288,298 | B1| * | 9/2001  | Rodriguez et al.| 585/648 |

FOREIGN PATENT DOCUMENTS

EP   229295    7/1987
EP   0836883   4/1998

OTHER PUBLICATIONS

Breck, Zeolite Molecular Sieves, 1974, pp. 636-637.
Anderson et al., J. Catalysis, vol. 58, 1979, pp. 114-130.
The Chemistry of Silica: Solubility, Polymerization, Colloid and Surface Properties, and Biochemistry, by Ralph K. Ifer, A Wiley Interscience Publication, 1979, pp. 312-461.
Advances in Fluid Catalytic Cracking, Catalytica, Mountain View, California, Part 1, 1987, p. 355.
J.R. Anderson, Structure of Metallic Catalysts, 1975, pp. 384-385.
Meier, et al., Atlas of Zeolite Structure Types, 1992, pp. 96-97, 98-99, 106-107, 132-133, 138-139, 140-141, 150-151, 178-179.

* cited by examiner

*Primary Examiner*—Elizabeth D Wood
(74) *Attorney, Agent, or Firm*—Gerald T. Hughes; Bruce M. Bordelon

(57) ABSTRACT

This invention relates to a mesoporous catalytic cracking catalyst, a process for the production of such catalysts, and a process utilizing such catalysts in cracking operations. The mesoporous fluidized catalytic cracking catalyst is selective for minimizing the production of coke and light gas. The catalyst comprises an amorphous, porous matrix having pores ranging in diameter from about 1 Å to about 10 Å and ranging in diameter from about 40 Å to about 500 Å, but substantially free of pores ranging in diameter from about 10 Å to about 40 Å.

47 Claims, 14 Drawing Sheets

FCC CATALYST

CROSS-REFERENCE TO RELATED APPLICATION

This patent application claims benefit of U.S. provisional patent application Ser. No. 60/557,748 filed Jun. 8, 2004. Applicants have a co-pending utility application U.S. patent application Ser. No. 11/106,289 which claims benefit of U.S. provisional patent application Ser. No. 60/577,747 filed Jun. 8, 2004 and contains related technology.

FIELD OF THE INVENTION

This invention relates to a mesoporous catalytic cracking catalyst, a process for the production of such catalysts, and a process utilizing such catalysts in cracking operations. In particular, it relates a mesoporous fluidized catalytic cracking catalyst selective for minimizing the production of coke and light gas, a process for the production of such catalyst, and a process utilizing such catalyst in fluidized catalytic cracking operations.

BACKGROUND OF THE INVENTION

Catalytic cracking, notably fluidized catalytic cracking ("FCC"), is a conventional (i.e., well known) process for converting higher average molecular weight, higher boiling hydrocarbons to more valuable, lower average molecular weight, lower boiling hydrocarbons. The products are useful as fuels for transportation, heating, etc. In the process, the conversion step is usually conducted by contacting a hydrocarbon feedstock, e.g., a heavy gas oil, with a moving bed of particulate catalyst in the substantial absence of hydrogen at elevated temperatures.

The FCC process is cyclic and includes, for example, separate zones for catalytic feedstock conversion, steam stripping, and catalyst regeneration. In the cycle, feedstock is blended with the FCC catalyst in a catalytic reactor, typically a riser reactor, for catalytic conversion into products. Lower boiling products are separated from the catalyst in a separator, e.g., a cyclone separator, and deactivated catalyst is conducted to a stripper and contacted with steam to remove entrained hydrocarbons; the latter can be combined with vapors from the cyclone separator, and both can be conducted away from the process. Stripped deactivated catalyst contains a carbonaceous residue, called "coke". Stripped catalyst recovered from the stripper is conducted to a regenerator, e.g., a fluidized bed regenerator, and contacted with a combusting gas, e.g., air, at elevated temperature to burn off the coke and reactivate the catalyst. Regenerated catalyst is then blended with the feedstock entering the riser, completing the cycle.

In continuous, cyclic operation, exothermic coke combustion in the regenerator provides at least a portion of the heat required to balance the endothermic feedstock cracking in the reactor. However, the presence of coke beyond that necessary for heat balance is undesirable since converting feedstock hydrocarbon into catalyst coke diminishes the quantity of hydrocarbon products obtained from the feedstock. There is therefore a need for catalysts that selectively make a greater quantity of hydrocarbon products but less catalytic coke.

Mesoporous FCC catalysts, such as those described in U.S. Pat. No. 5,221,648 are effective for feedstock conversion into high value hydrocarbon products, such as light olefins. Such catalysts have the desirable property that undesirably high catalyst coke levels are avoided in FCC operation. However, such catalysts contain a mesoporous silica-alumina matrix formed from silica sols that undesirably add to the expense of catalyst production. Moreover, conventional sols are acidic, and, consequently, can undesirably affect catalytic constituents, such as zeolite, during catalyst synthesis. There is therefore a need for improved mesoporous catalysts.

SUMMARY OF THE INVENTION

The invention relates to (I) a cracking catalyst, (II) a method for making the cracking catalyst, and (III) a catalytic cracking process.

In an embodiment, the invention relates to a composition, comprising at least one amorphous, porous matrix, each matrix having pores ranging in diameter from about 1 Å to about 10 Å and pores ranging in diameter from about 40 Å to at least about 500 Å, wherein in the pore range from 50 Å to 250 Å, there is a single maximum in differential pore volume distribution over the 50 Å to 250 Å range. The matrix is a single amorphous entity, or may be a blend of two or more individual amorphous matrices provided that each matrix individually meets the above-noted differential pore volume distribution requirement.

In a related embodiment, the composition's matrix has a differential pore volume as a function of matrix pore diameter, and this function has a maximum between 50 Å and 250 Å, preferably between 50 Å and 150 Å. The integrated differential pore volume for matrix pores having a diameter between about 1 Å and about 10 Å cannot be distinguished from the pore volume in zeolites typically used in the application. Thus it is not feasible to estimate the pore volumes for pores below about 10 Å because one cannot distinguish between the pore volume of the matrix and that of the zeolite. The integrated maximum pore volume for the volume of matrix pores having a diameter between about 10 Å and about 40 Å is less than about 0.03 cc/g, preferably less than about 0.01 cc/g, more preferably less than about 0.006 cc/g.

In another embodiment, the invention relates to a method for making a cracking catalyst precursor comprising:

(a) combining water, at least one molecular sieve, at least one aluminum hydroxide or aluminum oxyhydroxide, at least one clay, at least one urea compound having the formula

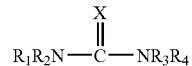

where $R_1$, $R_2$, $R_3$ and $R_4$ are individually H or $C_1$ to $C_4$ alkyl and X is sulfur or oxygen, and at least one phosphate to form a first mixture;

(b) combining the first mixture with sufficient aqueous alkaline silicate solution to form a slurry having a pH sufficient to prevent gellation of the aqueous alkaline silicate solution;

(c) drying the slurry at a drying temperature to remove water to form a first solid, said solid preferably comprising ammonium silicate, alkali silicate and alkali carbonate, urea compound, clay, at least one aluminum hydroxide or aluminum oxyhydroxide and molecular sieve;

(d) combining the first solid with water and an ion exchange composition comprising one or more mineral acid, preferably sulfuric acid, aluminum salts of mineral acids such as aluminum sulfate, and/or ammonium salts of mineral acids such as ammonium sulfate, to form the catalyst precursor, the catalyst precursor having a lower concentration of alkali metal compared to the first solid.

In a related embodiment, the invention relates to making catalyst from the catalyst precursor comprising the further steps of:
(e) combining the catalyst precursor with water and a second, independently selected ion exchange composition comprising one or more mineral acid such as sulfuric acid, aluminum salts of mineral acids such as aluminum sulfate, and/or ammonium salts of mineral acids such as ammonium sulfate, to form an ion-exchanged catalyst precursor having a lower concentration of alkali metal compared to the first and second solids;
(f) calcining the ion-exchanged catalyst precursor at a temperature ranging from about 250 to about 850° C. for a calcination time to make a calcined, ion-exchanged catalyst precursor; and
(g) contacting the calcined, ion-exchanged catalyst precursor with steam at a temperature ranging from about 650 to about 850° C. for a steaming time. A preferred steaming time is 4 to 48 hours. The steaming deactivates the cracking catalyst and simulates the deactivation in a commercial FCC unit which runs at significantly lower water pressures for a much longer time.

In yet another embodiment, the invention relates to a catalytic cracking process, comprising contacting a hydrocarbon feedstock with a catalytically effective amount of a cracking catalyst under catalytic conversion conditions, wherein the cracking catalyst comprises zeolite and an amorphous, porous matrix having pores ranging in diameter from about 1 Å to about 10 Å and pores ranging in diameter from about 40 Å to at least about 500 Å, wherein in the pore range from 50 Å to 250 Å, there is a single maximum in differential pore volume distribution over the 50 Å to 250 Å range.

In another related embodiment the catalytic conversion conditions include a temperatures of from about 450° C. to about 700° C., a hydrocarbon partial pressure of from about 10 to 40 psia, a cracking catalyst to feedstock (wt/wt) ratio of from about 3 to 100, where catalyst weight is total weight of the cracking catalyst, a pressure ranging from about atmospheric pressure to about 45 psig, and a feedstock residence time of from about 0.1 to about 20 seconds.

In a related embodiment, the cracking catalyst is made by:
(a) combining water, at least one molecular sieve, at least one aluminum hydroxide, at least one clay, urea compound, and at least one phosphate to form a first mixture, said urea compound having the formula:

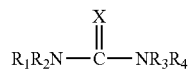

where $R_1$, $R_2$, $R_3$, and $R_4$ are individually H or $C_1$ to $C_4$ alkyl and X is sulfur or oxygen;
(b) combining the first mixture with sufficient aqueous alkaline silicate solution to form a slurry having a pH sufficient to prevent gellation of the aqueous alkaline silicate solution;
(c) drying the slurry at a drying temperature to remove water to form a first solid;
(d) combining the first solid with water and an ion exchange composition comprising one or more of sulfuric acid, aluminum sulfate, and/or ammonium sulfate, to form a catalyst precursor, the catalyst precursor having a lower concentration of alkali metal compared to the first solid;
(e) combining the catalyst precursor with water and a second, independently selected ion exchange composition comprising one or more of sulfuric acid, aluminum sulfate, and/or ammonium sulfate, to form an ion-exchanged catalyst precursor having a lower concentration of alkali metal compared to the first solid and catalyst precursor;
(f) calcining the ion-exchanged catalyst precursor at a temperature ranging from about 250 to about 850° C. for a calcination time to make a calcined, ion-exchanged catalyst precursor; and
g) contacting the calcined, ion-exchanged catalyst precursor with steam at a temperature ranging from about 650 to about 850° C. for a steaming time in order to make the cracking catalyst. The preferred steaming time is 4 to 48 hours.

Figure 1:
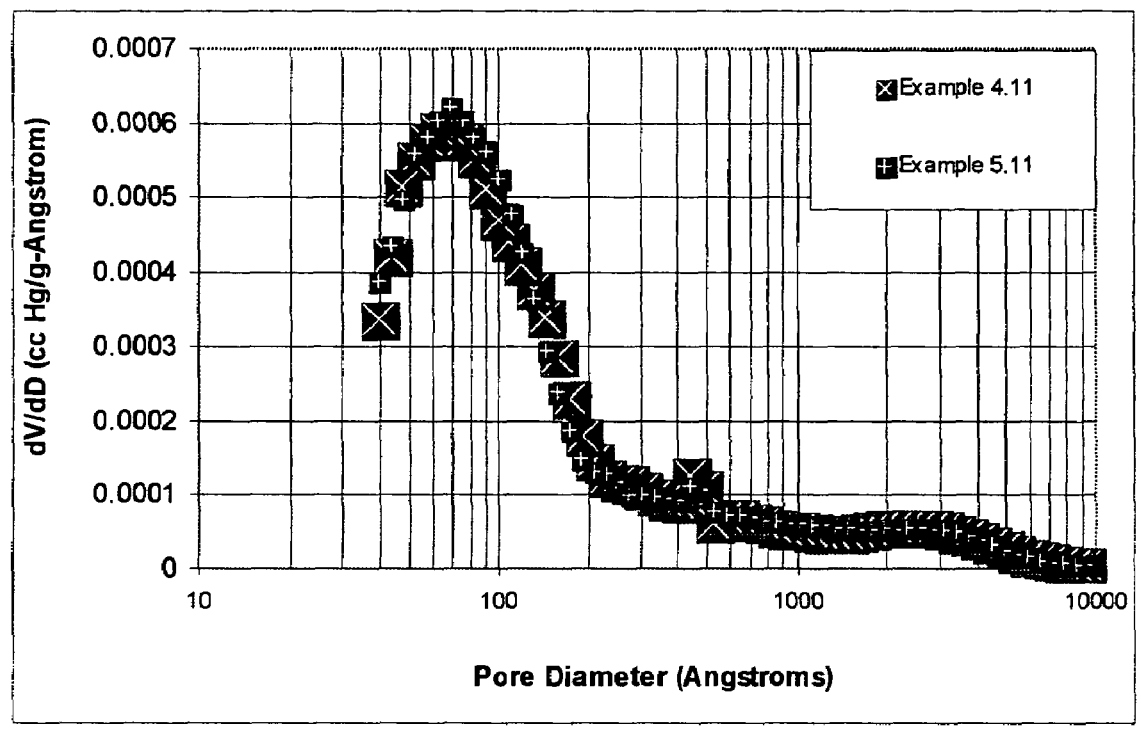
FIG. 1 is a plot of the differential mercury pore volume (dV/dD) vs. pore diameter for catalyst matrix between 40 and 10000 Angstroms.

DETAILED DESCRIPTION OF THE INVENTION (I) The Catalytic Cracking Catalyst

In an embodiment, the invention relates to a catalytic cracking catalyst composite ("composite" herein) comprising cracking catalyst (generally in particle form) and, optionally, other reactive and non-reactive components. More than one type of catalyst may be present in the composite. Typically, the catalyst comprises matrix and at least one crystalline molecular sieve, said matrix comprising at least one clay, at least one aluminum hydroxide or oxyhydroxide, and binder colloids. The molecular sieve can be an aluminosilicate, such as zeolite, having an average pore diameter between about 3 and 15 Angstroms. The pore diameter also sometimes referred to as effective pore diameter can be measured using standard adsorption techniques and hydrocarbons of known minimum kinetic diameters. See Breck, *Zeolite Molecular Sieves,* 1974 and Anderson et al., J. Catalysis 58, 114 (1979) and the "Atlas of Zeolite Structure Types," eds. W. H. Meier and D. H. Olson, Butterworth-Heineman, Third Edition, 1992. More than one type of catalyst may be present in the composite. For example, individual catalyst particles may contain large pore zeolite, shape selective zeolite, and mixtures thereof. In addition to catalyst particles, the composite may also include fines, inert particles, particles containing a metallic species such as platinum and compounds thereof.

In addition to matrix and molecular sieve, the catalyst can further comprise metals such as platinum, promoter species such as phosphorous-containing species, and species for imparting additional catalytic functionality (additional to the cracking functionality) such as bottoms cracking and metals passivation. Such an additional catalytic functionality may be provided, for example, by aluminum-containing species.

The inorganic matrix is a porous inorganic oxide matrix component for (i) binding the components together so that the catalyst is attrition resistant enough to survive inter-particle and reactor wall collisions (i.e., attrition resistance), and (ii) to provide a degree of size selectivity with respect to molecules capable of cracking on or in the molecular sieve. The inorganic oxide matrix may be made from, e.g., an inorganic oxide sol, which is then dried. Conventional sols can be used. Examples of conventional sols include silica sols derived from the reaction of sodium silicate and sulfuric acid/aluminum sulfate solutions, silica sols prepared through an ion-exchange process typified by materials with trade names such as "Ludox" and "Nyacol", 5/6 basic aluminum chlorhydroxide typified by materials such as "Chlorhydrol", and peptized alumina slurries such as those that can be made from the reaction of acid with materials such as the "Versal" series of aluminum pseudoboehmites. The matrix itself may possess catalytic properties, generally of an acidic nature, but matrix catalytic activity is not required. In an embodiment, the matrix comprises oxides of silicon and aluminum. The matrix can comprise more than one oxide phase, for example, aluminum oxyhydroxides-$\gamma$-alumina, boehmite, diaspore, and transitional aluminas such as $\alpha$-alumina, $\beta$-alumina, $\gamma$-alumina, $\delta$-alumina, $\epsilon$-alumina, $\eta$-alumina, and $\rho$-alumina can be employed. In a related embodiment, the alumina species is an aluminum hydroxide such as gibbsite, bayerite, nordstrandite, or doyelite. The matrix material may contain phosphorous or aluminum phosphate, and while generally undesirable, a small amount of sodium. The matrix may also comprise clays such as kaolin, bentonite, attapulgite, montmorillonite, hectorite and pyrophyllite.

The catalyst in the composite will now be described in more detail. The catalyst comprises matrix, said matrix comprising at least one clay, at least one aluminum hydroxide or oxyhydroxide, and binder colloids, in an amount ranging from about 5 wt. percent to about 100 wt. percent, preferably from about 8 wt. percent to about 95 wt. percent, based on the total weight of the catalyst, within which is dispersed a crystalline molecular sieve. In an embodiment, the molecular sieve is a crystalline aluminosilicate, i.e., zeolite, natural or synthetic, typically having a silica-to-alumina mole ratio (Si/Al) of about 2, and greater, and uniform pores with diameters ranging from about 3 Å to about 15 Å. The zeolite content of the catalyst ranges from about 0 percent to about 95 percent by weight, preferably from about 5 percent to about 92 percent, and more preferably from about 10 percent to about 60 percent, based on the total weight of the catalyst.

Under the IUPAC, microporous refers to pores in the 2 to 20 Å range and mesoporous in the 20 to 500 Å range. As defined in this invention, the respective ranges are about 1 to about 10 Å for micropores and about 40 Å to at least about 500 Å, preferably between 40 Å and 250 Å for mesopores. A functional definition of "mesoporous" as used herein is that porosity which extends above the range normally associated with the adsorption of mid-distillate in FCC, in particular the porosity in pores which have larger diameters than those associated with the standard commercial FCC zeolite, structure type FAU as set forth in the "Atlas of Zeolite Structure Types," ed. W. M. Meier, D. H. Olson and Ch. Baerlocher, Elsevier, 1996.

The differential pore volume for matrix pores has a maximum at a diameter between 40 Å and 250 Å as illustrated in FIG. 1. This Figure shows that in the pore range from 50 Å to 250 Å, there is a single maximum in the differential mercury pore volume over the 50 Å to 250 Å range.

Figure 2:
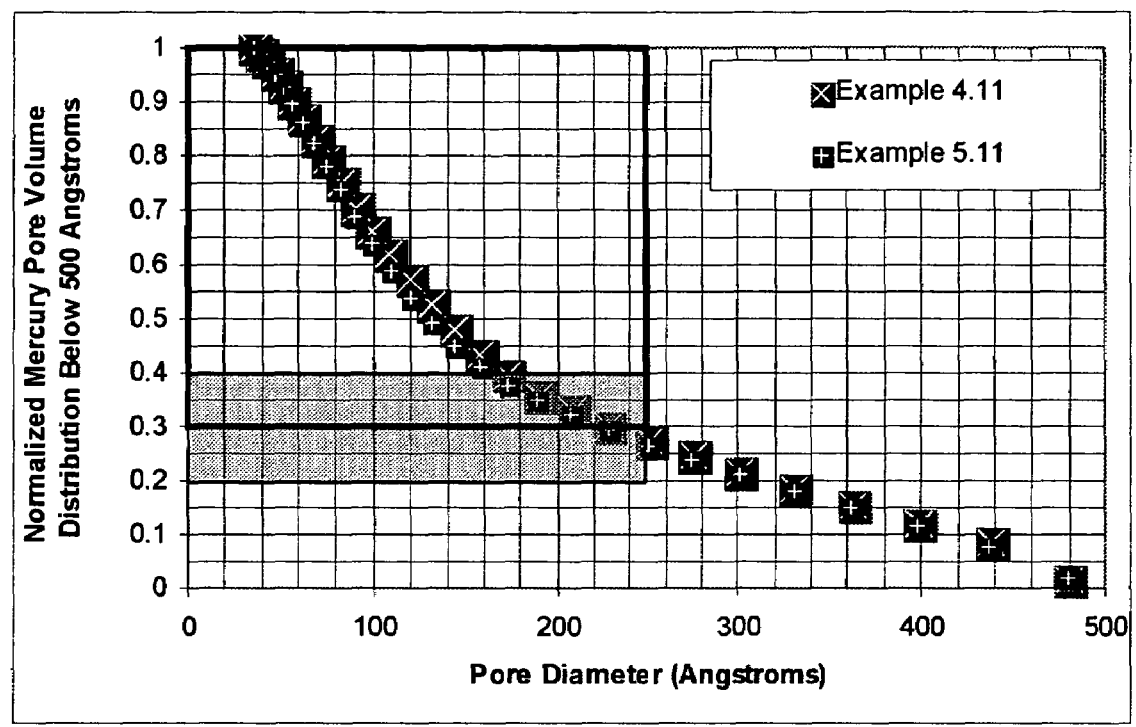
FIG. 2 is a plot of integrated differential mercury pore volume vs. pore diameter between 40 and 500 Angstroms for catalyst matrix.

The pore volume measured with mercury for matrix pores with diameters less than 250 Angstroms comprises between 60 and 80% of the pore volume measured by mercury below 500 Angstroms as illustrated in FIG. 2.

Mercury is not capable of measuring pore volumes below about 35 Angstroms and while gas phase adsorption done under very specific conditions may be able to capture the pore volume in this range, interference from pores associated with the zeolites contained in the system precludes accurate measurement of two different types of pores within this range.

Figure 3:
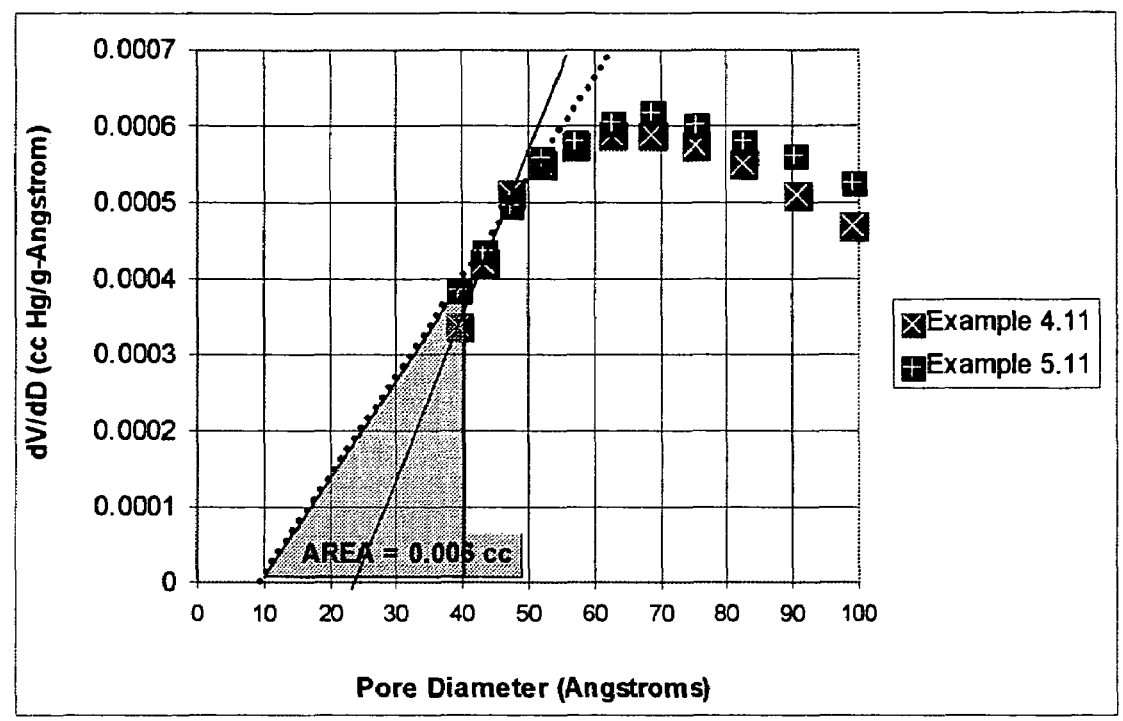
FIG. 3 is a plot of dV/dD vs. pore diameter showing the extrapolation of pore volume for pores in the 10 to 40 Angstrom range.

The matrix is substantially free of pores ranging in diameter between about 10 Å and about 40 Å, i.e., these pore diameters are substantially absent from the matrix pore distribution. By "substantially free of" is meant that the integrated maximum pore volume for the volume of matrix pores having a diameter between about 10 Å and about 40 Å is less than about 0.03 cc/g, preferably less than about 0.01 cc/g, more preferably less than about 0.006 cc/g. It has been discovered that an adequate indication of the pore volume below 35 Angstroms is given by the slope of the differential mercury porosimetry as is indicated in FIG. 3. When lines tangent to the differential mercury intrusion curve at points below 50 Angstroms intercept the pore diameter axis with a positive slope at a value not less than 0 Angstroms and most preferentially at not less than 10 Angstroms when the value of dV/dD is 0.0000, catalysts of this invention give lower coke yields. The following plots in FIG. 3 for two different materials of this invention show tangent lines which intercept the pore diameter at values of 10 and 25 Angstroms respectively.

For FIG. 3, which is a plot of dV/dD vs. pore diameter, the maximum volume of the pore volume of pores in the 10-40 Å is equal to 0.0004 ccHg/(g-Angstrom) times 30 Angstroms divided by 2=0.006 cc/g.

In an embodiment, the matrix is an amorphous, porous silica-alumina matrix having pores ranging in size from about 1 Å to about 10 Å and from about 40 Å to about 500 Å, but substantially free of pores ranging in size from about 10 Å to about 40 Å, provided that in the pore range from 50 Å to 250 Å, there is a single maximum in differential pore volume distribution over the 50 Å to 250 Å range.

In a related embodiment, the composition's matrix has a differential pore volume as a function of matrix pore diameter, and this function has a maximum between 50 Å and 150 Å. The integrated differential pore volume for matrix pores having a diameter between about 1 Å and about 10 Å cannot be distinguished from the pore volume in zeolites typically used in the catalyst. The integrated maximum pore volume for the volume of matrix pores having a diameter between 40 Å and about 500 Å ranges from about 0.06 cc/g to about 0.12 cc/g, and the integrated pore volume for matrix pores having a diameter between about 10 Å and about 40 Å is less than about 0.03 cc/g, preferably less than 0.01 cc/g.

Catalysts of these types are highly selective in the production of liquids, notably olefins, during fluid catalytic cracking operations, and coke make is low. The attrition resistance of these catalysts is quite high, as indicated by the low Davison Indices ranging from about 1 to about 8, most often and preferably from about 1 to about 5 measured in terms of the Davison Index. See "Advances in Fluid Catalytic Cracking," Catalytica, Mountain View, Calif., Part 1, 1987. p. 355.

A preferred catalyst particle comprises (a) amorphous, porous solid acid matrix, such as alumina, silica-alumina, silica-magnesia, silica-zirconia, silica-thoria, silica-beryllia, silica-titania, silica-alumina-rare earth and the like; and (b) a zeolite such as faujasite. The matrix can comprise ternary compositions, such as silica-alumina-thoria, silica-alumina-zirconia, magnesia and silica-magnesia-zirconia. The matrix may also be in the form of a cogel. Silica-alumina is particularly preferred for the matrix, and can contain about 10 to 40 wt. % alumina. As discussed, promoters can be added.

In an embodiment, the catalyst's zeolite includes zeolites which are iso-structural to zeolite Y. These include the ion-exchanged forms such as the rare-earth hydrogen and ultrastable (USY) form. The zeolite may range in crystallite size from about 0.1 to 10 microns, preferably from about 0.3 to 3 microns. The relative concentrations of zeolite component and matrix on an anhydrous basis may vary widely, with the zeolite content ranging from about 1 to 100, preferably 10 to 99, more usually from about 10 to 80, percent by weight of the dry composite.

The amount of zeolite component in the catalyst particle will generally range from about 1 to about 60 wt. %, preferably from about 5 to about 60 wt. %, and more preferably from about 10 to about 50 wt. %, based on the total weight of the catalyst. As discussed, the catalyst is typically in the form of a catalyst particle contained in a composite. When in the form of a particle, the catalyst particle size will range from about 10 to 300 microns in diameter, with an average particle diameter of about 60 microns. The surface area of the matrix material after artificial deactivation in steam at pressures higher than in commercial operations (i.e. at pressures of ca. 1 atmosphere) will be about $\leq 350$ m$^2$/g, preferably 50 to 200 m$^2$/g, more preferably from about 50 to 100 m$^2$/g. While the surface area of the catalysts will be dependent on such things as type and amount of zeolite and matrix components used, it will usually be less than about 500 m$^2$/g, preferably from about 50 to 300 m$^2$/g, more preferably from about 50 to 250 m$^2$/g, and most preferably from about 100 to 250 m$^2$/g.

Another preferred catalyst contains a mixture of zeolite Y and a second zeolite such as zeolite beta. The first and second zeolite may be on the same catalyst particle, on different particles, or some combination thereof. Zeolite amount and matrix type and properties are as set forth in the description of the Y zeolite catalyst. In a related embodiment the second zeolite is a shape-selective zeolite species such as ZSM-5. Alternatively, the shape-selective zeolite can be used in the catalyst without the first zeolite. The Y zeolite, shape-selective zeolite, or both can be on the same catalyst particle, on different particles, or some combination thereof.

Shape-selective zeolite species useful in the invention include medium pore size zeolites generally having a pore size from about 0.5 nm, to about 0.7 nm. Such zeolites include, for example, MFI, MFS, MEL, MTW, EUO, MTT, HEU, FER, and TON structure type zeolites (IUPAC Commission of Zeolite Nomenclature). Non-limiting examples of such medium pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred is ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245.

While the shape-selective species has been described in terms of zeolite, it can be a shape-selective (i.e., medium pore size) molecular sieve. In an embodiment, suitable medium pore size molecular sieve includes the silicoaluminophosphates (SAPO), such as SAPO-4 and SAPO-11 which is described in U.S. Pat. No. 4,440,871; chromium silicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates.

The large pore (e.g., zeolite Y) and shape-selective zeolites in the catalytic species can include "crystalline admixtures" which are thought to be the result of faults occurring within the crystal or crystalline area during the synthesis of the zeolites. Examples of crystalline admixtures of ZSM-5 and ZSM-11 are, for example, disclosed in U.S. Pat. No. 4,229,424. The crystalline admixtures are themselves medium pore, i.e., shape-selective, size zeolites and are not to be confused with physical admixtures of zeolites in which distinct crystals of crystallites of different zeolites are physically present in the same catalyst composite or hydrothermal reaction mixtures.

(II) Process for the Preparation of the Catalytic Cracking Catalyst

A. Preparation of Starting Material, or Catalyst Precursor Material

The catalyst of this invention comprises a catalytically active molecular sieve dispersed in a mesoporous inorganic matrix. In an embodiment, a crystalline aluminosilicate zeolite, or zeolite, suitably a USY or high silica USY zeolite, is admixed, preferably with water, urea compound, a phosphate, a clay, e.g., kaolin and an aluminum hydroxide, e.g. gibbsite, and these solids slurried. An aqueous silica solution, e.g., a silica sol (a binder colloid), is added to the aqueous slurry. The sol should not be allowed to gel. The slurry of blended components is dried, ion-exchanged to remove sodium, calcined, and then steamed to form the catalyst.

A catalyst precursor can be made by:
(a) combining molecular sieve with (i) an aqueous solution containing alkali silicate, e.g., sodium silicate; (ii) urea; (iii) a phosphate, such as alkali metal phosphate, ammonium phosphate, or both; and (iv) a clay component such as bentonite, kaolin, or both to form a slurry;
(b) spray drying the slurry; and
(c) removing sodium in an ion exchange operation.

Gibbsite may be added to the catalyst precursor as a component in part (a) above. The order of addition of the components (a) may be varied. A catalyst can be made from the precursor by additional ion exchange, if necessary to further remove sodium, and then calcining and steaming. The calcining and steaming can be conventional. Calcining can take place at temperatures in the range 250 to 850° C. The time of calcining depends on the temperature chosen but is typically greater than 1 hr. Steaming is preferably done for about 4 to 48 hours at temperatures of about 650 to 850° C.

The matrix, after steaming, can be characterized by pore size distribution, as measured by mercury porosimetry (Structure of Metallic Catalysts, J. R. Anderson. 1975, Chapter 6, Pages 384-385; theta=140 degrees, Hg surface tension equals 474 ergs/cm$^2$). Under the IUPAC, microporous refers to pores in the 2 to 20 Å.

The urea compound has the general formula

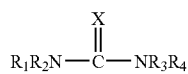

where $R_1$, $R_2$, $R_3$, and $R_4$ are individually H or $C_1$ to $C_4$ alkyl, preferably H and X is sulfur or oxygen, preferably oxygen. The preferred urea compound is urea, i.e., $H_2NCONH_2$.

Urea may be added to the slurry in an amount which is stoichiometric based on the reaction of urea with the sodium in sodium silicate to form sodium carbonate and ammonia. The amount of urea may vary from 0.8 to 1.2 times the stoichiometric amount based on the amount of sodium silicate. The addition of urea to the slurry generally leads to an increase in the pore volume of the catalysts according to the invention.

The phosphates are water soluble phosphate salts, typically sodium or ammonium phosphate salt, preferably sodium phosphate. The salts may be primary, secondary or tertiary salts such as $NaH_2PO_4$, $(NH_4)_2HPO_4$, $(NH_4)_3PO_4$, $Na_2HPO_4$, $Na_3PO_4$, as well as polyphosphates such as $(NaPO_3)_n$, $Na_4P_2O_7$ and the like. The amount of phosphate is preferably less than that required to react with all the aluminum present.

The clays used in the slurry may be kaolin, bentonite, attapulgite, montmorillonite, hectorite and pyrophyllite. The preferred clay is kaolin or bentonite, especially kaolin. In an embodiment, zeolite, clay, phosphate, sodium silicate, at least one aluminum hydroxide or aluminum oxyhydroxide and urea are added together or in sequence, in any order, and slurried at ambient temperature in a limited, controlled, and amount of water. In general, it has been found that the weight ratio of water:solids in the slurry can range between about 1:1 to about 4:1, preferably between about 1.5:1 to about 3:1. A weight ratio of water:solids approximating about 2:1 has been found highly successful in forming high quality catalysts. When the weight ratio of water:solids is less than about 1:1, the viscosity of the slurry is too high to spray dry, while weight ratios of water:solids exceeding about 4:1 may lead under some circumstances to a loss in the attrition-resistance of the catalyst. The pH of the slurry at this time ranges between about 10 and about 12 in order to avoid gellation of the silica sol. In an embodiment, the silica in the sol ranges from about 1.0 nm (nanometers) to about 22.0 nm, preferably from about 1.5 nm to about 15.0 nm average diameter. Silica sols are described in "The Chemistry of Silica: Solubility, Polymerization, Colloid and Surface Properties, and Biochemistry," by Ralph K. Iler. A Wiley Interscience Publication, 1979. Water may be added to the sodium silicate sol to maintain the water:solids weight ratio between about 1:1 and 3:1. The preferred solids contents are between 28 and 45 wt. %, based on catalyst precursor. The density of the slurry, on completing the addition of the starting materials, preferably ranges from about 1.2 to 1.4, and more preferably from about 1.20 to 1.35. Preferably also, the viscosity of the slurry at this time ranges from about 60 to 300 cPs, more preferably from about 80 to about 200 cPs at 22° C.

After blending zeolite, clay(s), at least one aluminum hydroxide or aluminum oxyhydroxide, urea, sodium silicate, and phosphate, with adjustment of the water content, density, and preferably also the pH and viscosity, the slurry can be dried in conventional process equipment, e.g., a spray drier, to form catalyst precursor.

In an embodiment, the slurry, preferably at/or below ambient temperature is conducted to a drier, preferably a spray drier, at a temperature sufficient to remove the water and form microspheres of average particle diameter ranging from about 10 microns to about 200 microns, preferably from about 60 microns to about 100 microns. The temperature is sufficiently high to dry the slurry and form a rigid structure, but insufficiently high as to cause alkali metal components (e.g., sodium from the sodium silicate) to be occluded within the zeolite and prevent it from being washed, ion-exchanged, and removed from the zeolite. Typically, the slurry is fed to a drier, preferably a spray drier at an average inlet temperature ranging from about 250° C. to about 500° C., and an outlet temperature ranging from about 125° C. to about 225° C.

Following drying, catalyst precursor, preferably in the form of a powder of microspherical particles, are washed with deionized water, e.g., between ambient temperature and 100° C. The washed precursor is then ion-exchanged for a time sufficient to remove the alkali metal, e.g., sodium, from the zeolite. In an embodiment, one or more of sulfuric acid, aluminum sulfate, and ammonium sulfate, are used. Preferably, aluminum sulfate hydrate and ammonium sulfate are used. Preferably, a stoichiometric amount of aluminum sulfate hydrate to ammonium sulfate is used, based on the amount of sodium present. Preferably, a 2/3 atomic ratio of $Al^{3+}/NH_4^+$ in sulfate salts is used. Data in Tables 2.3 and 2.5 following indicate that the optimum $Al^{3+}/NH_4^+$ molar ratio lies at this atomic ratio for the removal of sodium from the catalyst precursor.

When necessary, a second ion-exchange step can be used to further lower the amount of sodium. The ion-exchanged particles are generally again washed, e.g., between ambient temperature and 100° C. The zeolite portion of the catalyst, after ion-exchange, and washing, typically contains less than about 0.4 percent alkali metal, based on the weight of the catalyst. It is believed that a small amount of aluminum from the aluminum sulfate hydrate is incorporated into the catalyst during ion exchange.

While not wishing to be bound by any theory or model, the presence of phosphate in the slurry is believed to affect the matrix microporosity. It is believed that the phosphate interacts with aluminum species in the slurry to make aluminum phosphate. Since aluminum phosphate has an isoelectric point similar to silica's, particles in the slurry appear to have a similar charge and agglomeration is avoided. Agglomeration, it is believed, would lead to a degradation in the microporosity characteristics of the catalyst. Other factors, which are believed to lead to the unusual pore distribution of the catalysts of the invention, relate to the use of sodium silicate in the binder system in combination with urea as the directing compound.

(III) The Catalytic Cracking Process

In yet another embodiment the invention relates to a catalytic cracking process. The catalytic cracking process may be carried out in a fixed bed, moving bed, ebullated bed, slurry, transfer line (dispersed phase) or fluidized bed operation. Suitable hydrocarbon feedstocks (i.e., the primary feed) for the catalytic cracking process described herein include natural and synthetic hydrocarbonaceous oils boiling in the range of about 430° F. to about 1050° F., such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, naphtha, and mixtures thereof.

In an embodiment, the catalytic cracking process is performed in one or more FCC process units. Each unit comprises a reaction zone, usually a riser reaction zone, a stripping zone, a catalyst regeneration zone, and at least one separation zone. In an FCC process, the feedstock is conducted to and injected into the reaction zone wherein the primary feed contacts a flowing source of hot, regenerated catalyst. The hot catalyst vaporizes and cracks the feed at a temperature from about 450° C. to 650° C., preferably from about 500° C. to 600° C. The cracking reaction deposits carbonaceous hydrocarbons, or coke, on the catalyst, thereby deactivating the catalyst. The cracked products may be separated from the coked catalyst and a portion of the cracked products may be conducted to a separation zone such as a fractionator. Fractions such as a naphtha fraction can be separated from the cracked products in the separation zone and conducted away from the process.

FCC process conditions in the riser reactor's reaction zone include temperatures from about 450° C. to about 700° C., hydrocarbon partial pressures from about 10 to 40 psia (69 to 276 kPa), preferably from about 20 to 35 psia (138 to 241 kPa); and a catalyst to primary feed (wt/wt) ratio from about 3 to 100, where catalyst weight is total weight of the catalyst composite. The total pressure is from atmospheric to about 45 psig (411 kPa). Though not required, it is also preferred that steam be concurrently introduced with the feedstock into the reaction zone, with the steam comprising up to about 50 wt. %, preferably about 2 to about 10 wt. % of the primary feed. Also, it is preferred that the feedstock's residence time in the reaction zone be less than about 20 seconds, preferably from about 0.1 to about 20 seconds, and more preferably from about 1 to about 5 seconds.

The present process and catalyst provides both economic and technical advantages over state of the art commercial FCC catalysts. There are three major binders currently used to make FCC catalysts. These are the acidified silica sol binder, aluminum chlorhydrol, and peptized alumina. These three binding systems are acidic, and this acidity can adversely affect the physical properties of acid susceptible active materials. Previous mesoporous catalysts based on silica used Ludox® as the silica source. This is a more expensive ingredient than basic sodium silicate.

Figure 4A:
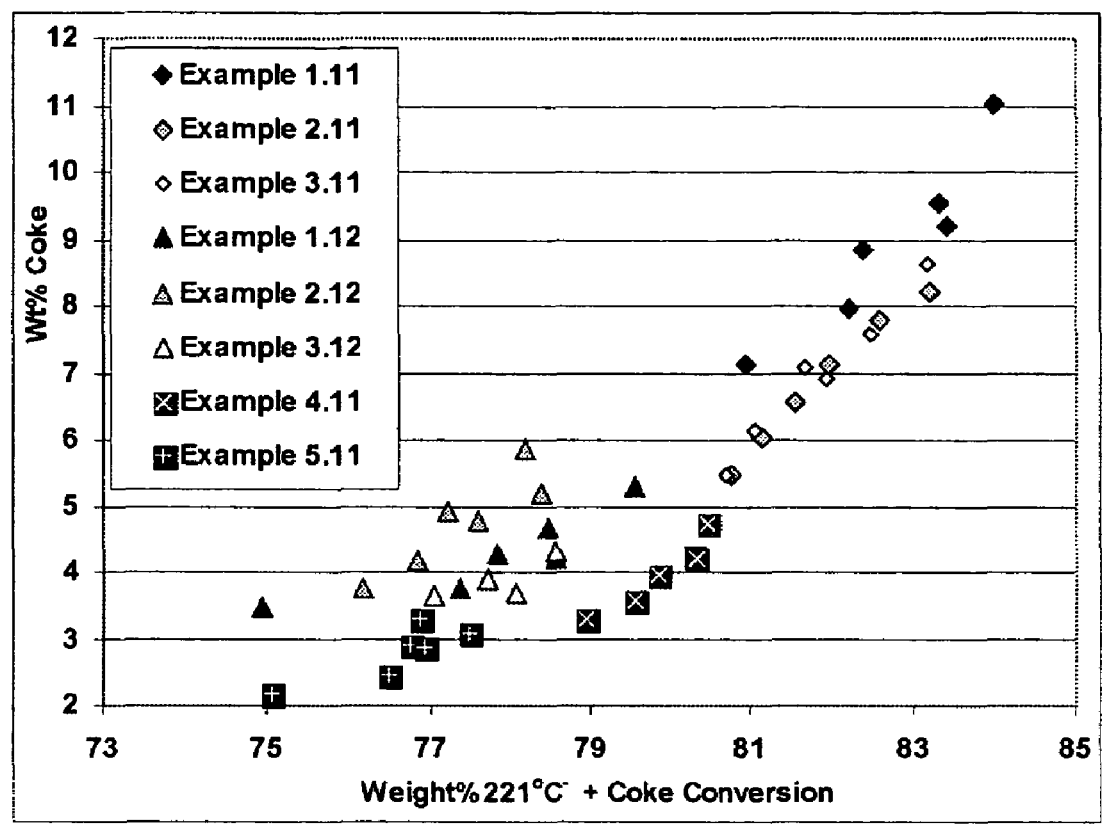
FIG. 4a is a plot showing a comparison of coke make vs. 221° C.- plus coke make for the base case comparative catalysts vs. catalysts of the invention.
Figure 4B:
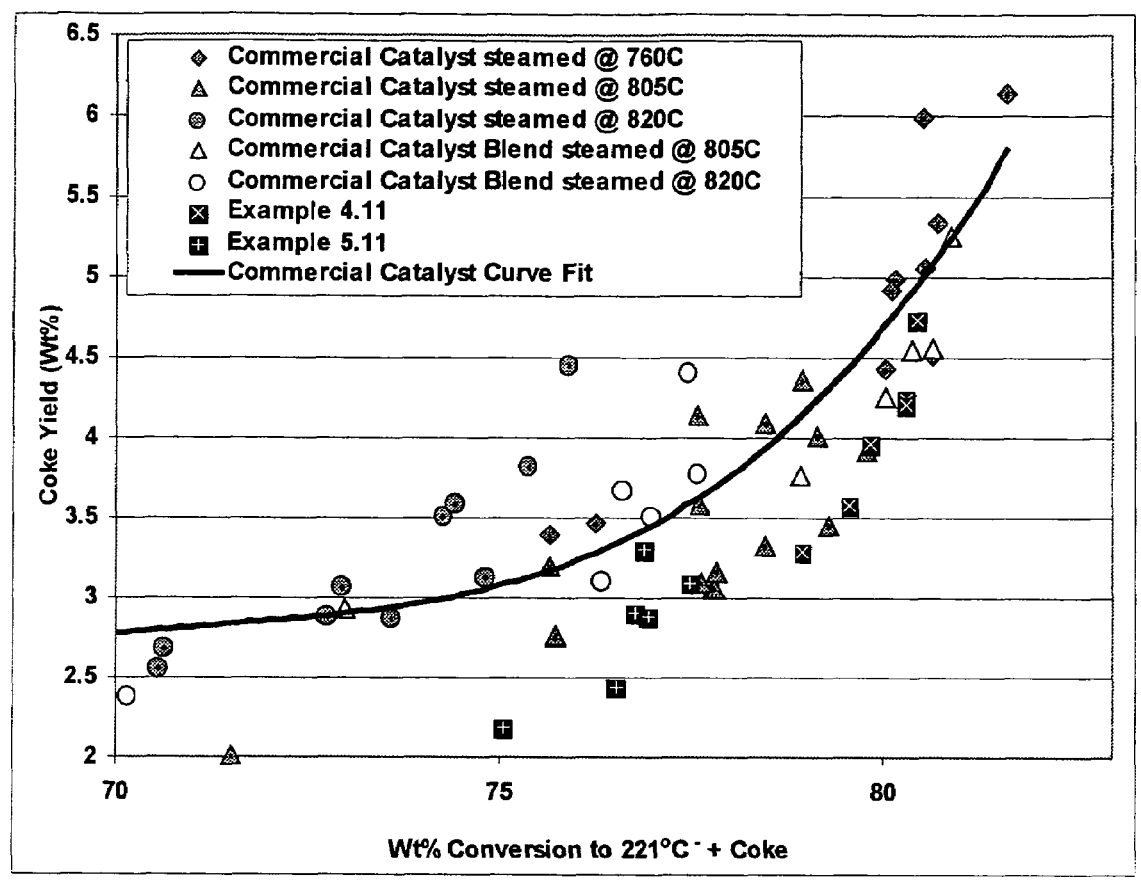
FIG. 4b is a plot showing a comparison of coke make vs. 221° C.- plus coke make for commercially available catalysts vs. catalysts of the invention.
Figure 5:
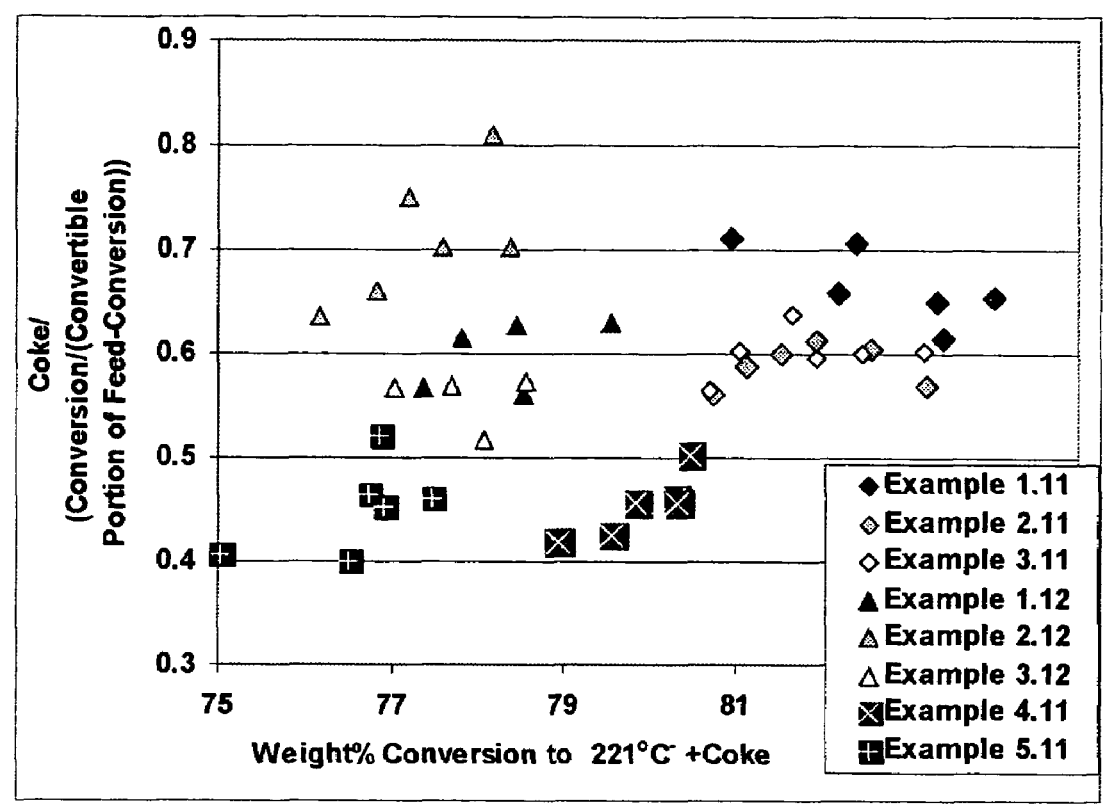
FIG. 5 is a plot showing a comparison of the coke yield normalized to remove the influence of conversion vs. 221° C.- plus coke make for the base case comparative catalysts vs. catalysts of the invention.

In the present process, sodium silicate (a basic system) can successfully bind FCC catalysts. Furthermore, the incorporation of urea with sodium silicate into the spray drier feed produces catalysts which are more mesoporous and more selective than catalysts which have not been so treated. Neutralization of the sodium contained in the sodium silicate is done with the ammonium salt of an acid which is stronger than silicic acid. The cheapest acid source is sulfuric acid. Neutralization with sulfuric acid requires careful control or gellation will occur with consequent loss in catalyst strength and integrity. Carbonic acid is a somewhat stronger acid than silicic acid and as such can also be used to neutralize sodium silicate. However, neutralization with carbonic acid leads to gellation because the carbonic acid forms a silica sol at a pH at which gellation readily occurs. Urea is the anhydride of diammonium carbonate and hydrolyzes slowly to form ammonia and sodium carbonate in basic solutions. Incorporation of urea in the binder system allows reaction to take place after drying so that a silica gel does not form prior to drying leading to weaker products. Incorporation of urea also may also assist in the formation of the present mesoporous pore structures, which improve product selectivity. Alkali metal salts of phosphate seem to be especially efficacious in forming pore structure, which leads to improved selectivity to products other than coke. Comparative Examples 1, 2, and 3 following show that materials made with ammonium phosphate fail to produce beneficial product selectivities. FIGS. 4 and 5 show the selectivity to products other than coke on conversion to 221° C.– is poorer for materials made with ammonium phosphate, viz. materials labeled "1.11", "2.11", "3.11". "1.12", "2.12", and "3.12", than for those made with alkali metal phosphates, viz. materials labeled "4.11" and "5.11". FIG. 8 shows the porosity in the region below 50 Angstroms is larger for the materials made with ammonium phosphate.

The following examples are presented to illustrate the invention and should not be considered limiting in any way.

COMPARATIVE EXAMPLE 1

No Urea, Diammonium Hydrogen Phosphate

This is a comparative (base case) example using sodium silicate as the silica source in the binder but without adding urea during catalyst preparation.

To 3000 g of water in a 2-gallon plastic bucket was added: 1319.3 g of zeolite Z-14G NaUSY, 12.5 g diammonium hydrogen phosphate, 728 g of Hydrite UF kaolin clay, and 560 g of Spacerite S-11 Gibbsite. The resulting mixture was stirred 30 min with a Cowles mixer.

1742.2 g of "N" brand Sodium Silicate was diluted with 1700 g of deionized water and added to the water/zeolite/diammonium hydrogen phosphate/clay slurry and then colloid milled. The pH of colloid-milled slurry was 10.8 at 22° C. The viscosity of the slurry was 188 cPs at 100 rpm, and the density of the slurry was 1.322 g/cc.

The slurry was spray dried in a Bowen #1 Tower Spray Drier (rated at 7/35 kg/hr with an airflow of 250 cfm at 80° C.) with an exit temperature of 121° C. 787 g of solids with 50% above 74.4 microns were collected from the Main Tower Pot. The properties of the slurry and product are summarized in Table 1.1.

TABLE 1.1

Base Case (No Urea)
Total Dried Product Desired 2500

|  | Wt % in Prod | Weights | Catalytic Solids | Water | Na2O | Na (moles) | Water (g) | Solids (g) |
|---|---|---|---|---|---|---|---|---|
| Zeolite | 40 | 1319.26 | 0.758 | 0.22 | 0.03 | 1.72 | 290.2 | 1029.0 |
| "N" Sodium Silicate | 20 | 1742.16 | 0.287 | 0.624 | 0.089 | 5.00 | 1087.1 | 655.1 |
| Hydrite ® UF | 25 | 728.44 | 0.858 | 0.142 | 0 |  | 103.4 | 625.0 |
| Spacerite ® S-11 Gibbsite | 15 | 559.70 | 0.67 | 0.33 |  |  | 184.7 | 375.0 |
| Wgt % solids (must be 100) | 100 | 4563.74 |  |  |  |  |  |  |

To ion-exchange this material, the following solution of ammonium sulfate and aluminum sulfate was used:

360 g $Al_2(SO_4)_3 \cdot 16H_2O$ was dissolved in 2040 g DI water 106.2 g $(NH_4)_2SO_4$ was dissolved in 2294 g DI water.

To 120 g of the spray drier product was added 200 g of the $Al_2(SO_4)_3 \cdot 16H_2O$ solution and 200 g of the $(NH_4)_2SO_4$ solution. This mixture was shaken at 80° C. in a shaker bath @260 rpm for 1 hour, cooled and then washed 3× with 500 g of DI (deionized) water at 80° C. on the filter and air dried. The product from this first ion exchange, Example 1.1, was analyzed. The remaining sample was added to 200 g of the dilute aluminum sulfate solution and then 200 g of the dilute ammonium sulfate solution was added. This was shaken for 1 hour at 80° C. at 260 rpm, washed 3×500 g of deionized water, dried at 120° C. for 2 hours and calcined to give Example 1.2. Table 1.2 contains the analyses for these samples.

TABLE 1.2

|  | Example 1.1 | Example 1.2 |
|---|---|---|
| SiO2 (wt %) | 62.04 | 63.39 |
| Al2O3 (wt %) | 36.99 | 36.29 |
| Na (wt %) | 0.72 | 0.24 |

COMPARATIVE EXAMPLE 2

Urea, Diammonium Hydrogen Phosphate

This is a further comparative example. Unlike standard commercial FCC catalysts, the preparation takes place in a basic environment. It is assumed that 1 mole of urea neutralizes 2 moles of sodium by decomposing to form ammonium silicate and sodium carbonate.

To 2500 g of water in a 2 gallon plastic bucket was added: 1319.3 g of zeolite Z-14G NaUSY, 12.5 g diammonium hydrogen phosphate, 728 g of Hydrite UF kaolin clay, and 560 g of Spacerite S-11 Gibbsite. The resulting mixture was stirred 30 min with a Cowles mixer.

1742.2 g of "N" brand Sodium Silicate was diluted with 2275 g of deionized water and added to the water/zeolite/diammonium hydrogen phosphate/clay slurry and then colloid milled. The pH of colloid-milled slurry was 11.0 at 21° C. The viscosity of the slurry was 247 cPs at 100 rpm. The slurry was spray dried in a Bowen #1 Tower Spray Drier (rated at 7/35 kg/hr with an airflow of 250 cfm at 80° C.) with an exit temperature of 145° C.

1436 g of solids was collected from the Main Tower Pot. The composition of the slurry and product are summarized in Table 2.1.

TABLE 2.1

Total Dried Product Desired 2500

|  | Wt % in Prod | Weights | Catalytic Solids | Water | Na2O | Na (moles) | Water (g) | Solids (g) |
|---|---|---|---|---|---|---|---|---|
| Zeolite | 40 | 1319.26 | 0.758 | 0.22 | 0.03 | 1.72 | 290.2 | 1029.0 |
| "N" Sodium Silicate | 20 | 1742.16 | 0.287 | 0.624 | 0.089 | 5.00 | 1087.1 | 655.1 |
| Hydrite ® UF kaolin | 25 | 728.44 | 0.858 | 0.142 | 0 |  | 103.4 | 625.0 |
| Diammonium hydrogen phosphate |  | 12.50 |  |  |  |  | 0.0 | 12.5 |
| Spacerite ® S-11 Gibbsite | 15 | 559.70 | 0.67 | 0.33 |  |  | 184.7 | 375.0 |
| Urea to match Na |  | 201.67 |  | 0 | 0 |  |  | 201.7 |
| Wt % solids (must be 100!) | 100 | 4563.74 |  |  |  |  |  |  |
| Wgt Fraction Solids in Spray Drier Feed |  | 0.31 |  |  |  |  |  |  |
| Total Water to be added |  | 4775.07 |  |  |  |  |  |  |

52.4 g $H_2SO_4$ was dissolved in 1548 g of DI water to make a dilute sulfuric acid solution.

270 g $Al_2(SO_4)_3 \cdot 16H_2O$ was dissolved in 1530 g of DI water to make a dilute aluminum sulfate solution with 4.5× $10^{-4}$ moles $Al^{3+}$/g solution.

70.8 g $(NH_4)_2SO_4$ was dissolved in 1529.2 g of DI water to make a dilute ammonium sulfate solution with 6.7×$10^{-4}$ moles $NH_4^+$/g solution.

To 100 g of spray drier product was added solutions according to Table 2.2.

TABLE 2.2

| Example 2.1 | Example 2.2 | Example 2.3 | Example 2.4 | Example 2.5 |
|---|---|---|---|---|
| 200 g dilute sulfuric acid | 100 g dilute sulfuric acid | 200 g dilute aluminum | 100 g dilute aluminum | 200 g dilute ammonium |

TABLE 2.2-continued

| Example 2.1 | Example 2.2 | Example 2.3 | Example 2.4 | Example 2.5 |
|---|---|---|---|---|
| solution | solution/ 100 g dilute aluminum sulfate solution | sulfate solution | sulfate solution/ 100 g dilute ammonium sulfate solution | sulfate solution |

These were shaken at 80° C. for 1 hour; filtered, washed 3× with 400 g of DI water at 80° C. for 0.5 hours on the shaker bath and warmed to 120° C. at 1° C./min and dried at 120° C., 6 h.

The elemental analyses on these samples are contained in Table 2.3.

TABLE 2.3

|  | Example 2.1 | Example 2.2 | Example 2.3 | Example 2.4 | Example 2.5 |
|---|---|---|---|---|---|
| SiO2 (wt %) | 64.82 | 63.67 | 63.22 | 62.00 | 63.01 |
| Al2O3 (wt %) | 33.88 | 35.34 | 36.00 | 37.35 | 34.84 |
| Na (wt %) | 0.96 | 0.74 | 0.57 | 0.49 | 1.59 |

Note that the $Al_2O_3/SiO_2$ weight ratio is 0.60 with example 2.4, the $NH_4^+/Al^{3+}$ preparation, and only 0.55 with example 2.5, the $NH_4^+$ preparation. This indicates that the system is incorporating roughly 0.60/0.55-1=9.1% more alumina or that ca. 0.091×35=3.2% alumina (1.6 g alumina) has been added to the original weight of the catalyst. This alumina comes from the 100/1800×270×102/666=2.3 g in the exchange solution.

To further demonstrate the specific nature of this interaction the spray dried product of Example 2 was exchanged in a second series in which only the dilute aluminum sulfate solution and the dilute ammonium sulfate solution were used as outlined in Table 2.4. To 50 g of spray drier product was added solutions according to Table 2.4:

TABLE 2.4

| Example 2.6 | Example 2.7 | Example 2.8 |
|---|---|---|
| 150 g dilute aluminum sulfate solution/ 50 g dilute ammonium sulfate solution | 100 g dilute aluminum sulfate solution/ 100 g dilute ammonium sulfate solution | 50 g dilute aluminum sulfate solution/ 150 g dilute ammonium sulfate solution |

These were shaken at 80° C. for 1 hour; filtered, washed 3× with 400 g of DI water at 80° C. for 0.5 hours on the shaker bath and warmed to 120° C. at 1° C./min and dried at 120° C., for 6 hours. Table 2.5 clearly shows that for these sodium silicate bound catalysts, sodium removal is most efficient with a combination of an aluminum salt and an ammonium salt in a specific ratio, namely, 2 moles of Al/3 moles of ammonia.

TABLE 2.5

|  | Example 2.6 | Example 2.7 | Example 2.8 |
|---|---|---|---|
| SiO2 (wt %) | 63.29 | 62.24 | 61.89 |
| Al2O3 (wt %) | 36.04 | 37.14 | 37.11 |
| Na (wt %) | 0.50 | 0.46 | 0.74 |

To demonstrate that successive ion exchanges complete the removal of sodium from the catalyst, 120 g of the spray drier product of Example 2 was added to 200 g of the dilute aluminum sulfate solution and then 200 g of the dilute ammonium sulfate solution was added. This was shaken for 1 hour at 80° C. at 260 rpm, washed 3×500 g of deionized water, dried at 120° C. for 4 hours to give Example 2.9. The remaining sample was added to 200 g of the dilute aluminum sulfate solution and then 200 g of the dilute ammonium sulfate solution was added. This was shaken for 1 hour at 80° C. at 260 rpm, washed 3×500 g of deionized water, dried at 120° C. for 2 hours and calcined to give Example 2.10. The volatile free analyses for examples 1.9 and 1.10 are contained in Table 2.6.

TABLE 2.6

|  | Example 2.9 | Example 2.10 |
|---|---|---|
| SiO2 (wt %) | 61.55 | 62.68 |
| Al2O3 (wt %) | 37.54 | 37.01 |
| Na (wt %) | 0.68 | 0.23 |

COMPARATIVE EXAMPLE 3

2× Urea, Diammonium Hydrogen Phosphate

This comparative example illustrates the removal of sodium by ion exchange from the product from the spray drier which is prepared as follows. To 3000 g of water in a 2-gallon plastic bucket was added 1319.3 g of zeolite NaUSY, 12.5 diammonium hydrogen phosphate, 728 g of Hydrite UF® kaolin clay, 403.5 g of urea 560 g of Spacerite® S-11 Gibbsite. The resulting mixture was stirred 30 minutes with a Cowles mixer.

1742.2 g of "N"® brand Sodium Silicate was diluted with 1700 g of deionized water and added to the water/zeolite/diammonium hydrogen phosphate/clay slurry and then colloid milled. The pH of colloid-milled slurry was 10.79 at 17° C. The viscosity of the slurry was 199cP at 100 rpm, and the density of the slurry was 1.293 g/cc.

The slurry as spray dried in a Bowen #1 Tower Spray Drier (rated at 7/35 kg/hr with an airflow of 250 cfm at 80° C.) with an exit temperature of 160° C. After drying, collection and weighing of the solids from the bottom of the main tower and the solids from the bottom of the cyclone yielded 1129 g of solids with 50% above 66.0 microns. The nominal slurry and product compositions are shown in Table 3.1.

TABLE 3.1

| Total Dried Product Desired 2500 | | | | | | | |
|---|---|---|---|---|---|---|---|
|  | Wt % in Prod | Weights | Catalytic Solids | Water | Na₂O | Na (moles) | Water (g) | Solids (g) |
| Zeolite | 40 | 1319.26 | 0.758 | 0.22 | 0.03 | 1.72 | 290.2 | 1029.0 |
| "N" Sodium Silicate | 20 | 1742.16 | 0.287 | 0.624 | 0.089 | 5.00 | 1087.1 | 655.1 |

TABLE 3.1-continued

| | Total Dried Product Desired 2500 | | | | | | |
|---|---|---|---|---|---|---|---|
| | Wt % in Prod | Weights | Catalytic Solids | Water | Na₂O | Na (moles) | Water (g) | Solids (g) |
| Hydrite UF ® kaolin | 25 | 728.44 | 0.858 | 0.142 | 0 | | 103.4 | 625.0 |
| Spacerite S-11 ® Gibbsite | 15 | 559.70 | 0.67 | 0.33 | | | 184.7 | 375.0 |
| Urea | | 404 | | 0 | 0 | | | 201.7 |
| Wt % solids (must be 100) | 100 | 4563.74 | | | | | | |

120 g of the spray drier product of Example 3 was added to 200 g of the dilute aluminum sulfate solution and then 200 g of the dilute ammonium sulfate solution was added. This was shaken for 1 hour at 80° C. at 260 rpm, washed 3×500 g of deionized water, dried at 120° C. for 4 hours to give Example 3.1. The remaining sample was added to 200 g of the dilute aluminum sulfate solution and then 200 g of the dilute ammonium sulfate solution was added. This was shaken for 1 hour at 80° C. at 260 rpm, washed 3×500 g of deionized water, dried at 120° C. for 2 hours and calcined to give Example 3.2. The volatile free analyses for examples 3.1 and 3.2 are contained in Table 3.2.

TABLE 3.2

| | Example 3.1 | Example 3.2 |
|---|---|---|
| SiO2 (wt %) | 61.46 | 62.04 |
| Al2O3 (wt %) | 37.73 | 37.69 |
| Na (wt %) | 0.60 | 0.20 |

EXAMPLE 4

Urea, Disodium Hydrogen Phosphate

This example is a catalyst of this invention. In its preparation, an alkali phosphate salt, urea, and sodium silicate were employed to make a spray dried product which was ion-exchanged using the optimum mix of aluminum and ammonium salts to make a finished catalyst. When this catalyst was then deactivated using steam, it had a pore structure according to the catalyst and process of the invention. To 3000 g of water in a 2 gallon plastic bucket was added: 13.4 g disodium hydrogen phosphate, 200 g of urea, 373 g Alcoa C-33 gibbsite, 1319.3 g of zeolite NaUSY, 874 g of Hydrite UF kaolin clay. The resulting mixture was stirred with a Cowles mixer until it flowed smoothly.

1742.2 g of "N" brand Sodium Silicate was diluted with 2400 g of deionized water and to this was added the water/disodium hydrogenphosphate/urea/gibbsite/zeolite/clay slurry. This slurry was then colloid milled twice. The pH of colloid-milled slurry was 10.8 at 22° C. The viscosity of the slurry was 188 cPs at 100 rpm, and the density of the slurry was 1.288 g/cc. The slurry was spray dried in a Bowen #1 Tower Spray Drier (rated at 7/35 kg/hr with an airflow of 50 cfm at 80° C.) with an exit temperature of 150° C. 939 g of solids were collected from the Main Tower Pot.

120 g of the spray drier product of Example 4 was added to 200 g of the dilute aluminum sulfate solution and then 200 g of the dilute ammonium sulfate solution was added. This was shaken for 1 hour at 80° C. at 260 rpm, washed 3×200 g of deionized water. The wet cake was added to 200 g of the dilute aluminum sulfate solution and then 200 g of the dilute ammonium sulfate solution was added. This was shaken for 1 hour at 80° C. at 260 rpm, washed 3×200 g of deionized water, dried at 150° C. for 1 hour and calcined at 760° C. for 1 hour to give Example 4.1. Table 4.1 contains the analyses:

TABLE 4.1

| | Example 4.1 |
|---|---|
| SiO2 (wt %) | 61.22 |
| Al2O3 (wt %) | 38.38 |
| Na (wt %) | 0.29 |

EXAMPLE 5

Urea, Tetrasodium Pyrophosphate

This example is a catalyst according to the catalyst and process of the invention. To 3000 g of water in a 2-gallon plastic bucket was added: 21.0 g tetrasodium pyrophosphate, 200 g of urea, 373 g Alcoa C-33 gibbsite, 1319.3 g of zeolite NaUSY, 874 g of Hydrite UF kaolin clay. The resulting mixture was stirred with a Cowles mixer until it flowed smoothly.

1742.2 g of "N" brand Sodium Silicate was diluted with 2400 g of deionized water and to this was added the water/tetrasodium pyrophosphate/urea/gibbsite/zeolite/clay slurry. This slurry was then colloid milled twice. The pH of colloid-milled slurry was 11.0 at 22° C. The viscosity of the slurry was 189 cPs at 100 rpm, and the density of the slurry was 1.26 g/cc. The slurry as spray dried in a Bowen #1 Tower Spray Drier (rated at 7/35 kg/hr with an airflow of 250 cfm at 80° C.) with an exit temperature of 150° C. 980 g of solids were collected from the Main Tower Pot.

120 g of the spray drier product of Example 5 was added to 200 g of the dilute aluminum sulfate solution and then 200 g of the dilute ammonium sulfate solution was added. This was shaken for 1 hour at 80° C. at 260 rpm, and washed 3×200 g of deionized water. The wet cake was added to 200 g of the dilute aluminum sulfate solution and then 200 g of the dilute ammonium sulfate solution was added. This was shaken for 1 hour at 80° C. at 260 rpm, washed 3×200 g of deionized water, dried at 150° C. for 1 hour and calcined at 760° C. for 1 hour to give Example 5.1. Table 5.1 contains the analyses:

TABLE 5.1

| | Example 5.1 |
|---|---|
| SiO2 (wt %) | 62.28 |
| Al2O3 (wt %) | 37.32 |
| Na (wt %) | 0.29 |

EXAMPLE 6

Examples 1, 2, 3, 4, and 5 were calcined at 760° C. Examples 1, 2, and 3 were then steamed at a temperature of 760° C. for 16 hours to give Examples 1.11, 2.11, and 3.11 in Table 6, then at a temperature of 788° C. for 16 hours to produce examples 1.12, 2.12, and 3.12 respectively, in Table 6. Examples 4 and 5 were steamed at 788° C., 16 hours to produce the catalysts 4.11 and 5.11 for evaluation in an ACE FCC. An ACE unit is a commercially available unit made for FCC laboratory evaluations and is manufactured by Xytel Co., Elk Grove Village, Ill. The properties of the steamed catalysts are set forth in Table 6.

TABLE 6

| | Total Surface Area (BET) m2/g | Zeolite Surface Area (m2/g) | Matrix Surface Area (m2/g) | Normalized Silica (wt %) | Normalized Alumina (wt %) | Normalized Na (wt %) |
|---|---|---|---|---|---|---|
| Example 1.11 | 205.3 | 150.0 | 55.4 | 62.57 | 37.11 | 0.24 |
| Example 2.11 | 213.6 | 155.8 | 57.7 | 62.53 | 37.17 | 0.22 |
| Example 3.11 | 225.6 | 166.4 | 59.2 | 62.18 | 37.55 | 0.20 |
| Example 1.12 | 144.0 | 102.0 | 42.1 | | | |
| Example 2.12 | 155.0 | 112.8 | 42.69 | | | |
| Example 3.12 | 151.3 | 114.9 | 36.37 | | | |
| Example 4.11 | 180.2 | 143.6 | 36.6 | 62.15 | 37.48 | 0.28 |
| Example 5.11 | 184.0 | 147.3 | 36.8 | 58.72 | 40.87 | 0.31 |

Examples 1.11, 2.11, 3.11, 1.12, 2.12, and 3.12 as comparison catalysts and 4.11 and 5.11 of this invention were then evaluated by injecting a vacuum gas oil with the following physical properties over the catalyst in a fixed fluidized bed reactor whose operations are described in the open literature. The conditions under which the unit operated follow:

| | |
|---|---|
| REACTOR INIT TEMP F. | 1030 |
| REACTOR MIN TEMP F. | 1010 |
| FLUID BED REGEN TEMP F. | 1250 |
| CAT STRIP TIME SEC | 330-610 s |
| LIQ STRIP TIME SEC | 350-1050 s |
| N₂ DURING RXN TOP FEED SCCM | 20 |
| N₂ DURING RXN TOP FLUID SCCM | 20 |
| N₂ DURING RXN BTM FLUID SCCM | 100 |
| N₂ DURING RXN TOT PURGE SCCM | 41 |
| N₂ DURING REM LIQ STRIP SCCM | 100 |
| CAT TO OIL RATIO WT/WT | 3.0-9.0 |
| CATALYST CHARGE WT GMS | 9.0 |
| OIL CHARGE WT GMS | 1-3 |

The feedstock used was a Gulf Coast vacuum gas oil having the following properties:

| | |
|---|---|
| GRAVITY, API | 23.9 |
| CARBON | 85.81 |
| HYDROGEN | 12.55 |
| NITROGEN, SYRINGE INLET (ppm) | 909 |
| N (basic) wppm | 313 |
| SULFUR IN OILS | 0.968 |
| Ni (wppm) | 0.42 |
| V (wppm) | 0.37 |
| CARBON RESIDUE (MICRO) | 0.22 |
| TEMP. @ 5.0 WT % | 658.4 |
| TEMP. @ 10.0 WT % | 701.7 |
| TEMP. @ 20.0 WT % | 755.7 |
| TEMP. @ 30.0 WT % | 795.7 |
| TEMP. @ 40.0 WT % | 829 |
| TEMP. @ 50.0 WT % | 860.1 |
| TEMP. @ 60.0 WT % | 892.9 |
| TEMP. @ 70.0 WT % | 931.2 |
| TEMP. @ 80.0 WT % | 970.7 |
| TEMP. @ 90.0 WT % | 1014 |
| TEMP. @ 95.0 WT % | 1033.1 |
| SATS | 55.4-56.56 |
| 1 RING AROM | 20.4-20.9 |
| 2 RING AROM | 11.7-11.1 |
| 3 RING AROM | 5.7-5.5 |
| 4 RING AROM | 3.1-3.1 |
| POLARS | 3.8-2.9 |
| SATS (UV CORES) | 0.04 |
| 1 RING AROM (UV CORES) | 3.3-3.0 |
| 2 RING AROM (UV CORES) | 4.4-3.7 |
| 3 RING AROM (UV CORES) | 3.4-2.9 |
| 4 RING AROM (UV CORES) | 2.1-2.2 |
| POLARS (UV CORES) | 1.9-1.3 |

Consistent with the observed differences in the pore size distribution of the steamed, artificially deactivated catalysts, the base case and the two examples of this invention show significantly different selectivities for coke in the cracking of a Vacuum Gas Oil in a small captive fixed fluidized bed unit. (ACE). FIG. 4a is a graph of coke make vs. 430° F.− (221° C.−)+coke make for base case comparative catalysts vs. catalysts of the invention. FIG. 4b shows that the catalysts of this invention are more coke selective than the average coke selectivity seen from commercially available state of the art catalysts.

FIG. 4a shows that the catalysts of this invention (Examples 4 and 5) differ from the similar comparative catalysts in that they produce less coke for a given conversion level than other catalysts made with ammonium phosphates. In FIG. 5, the same data are normalized for conversion which removes the slopes for coke vs. conversion seen in FIG. 4.

Figure 6A:
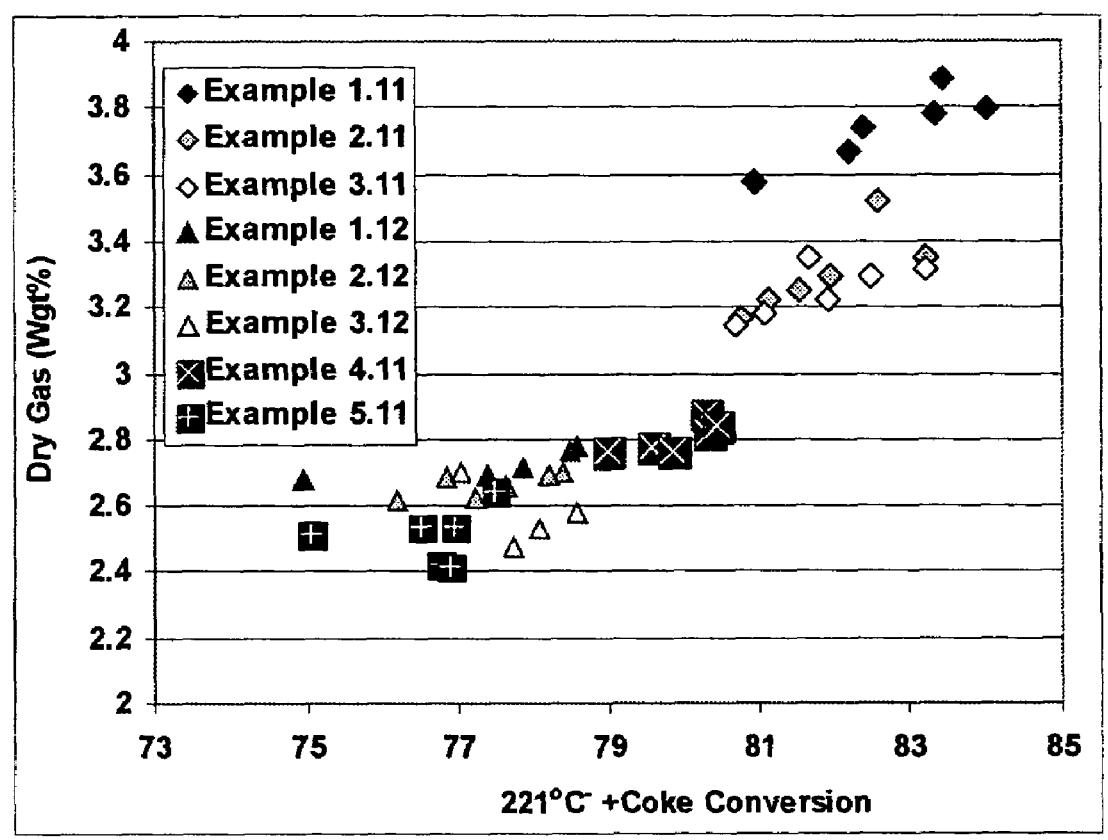
FIG. 6a is a plot showing a comparison of dry gas make vs. 221° C.-+ coke make for the base case comparative catalyst vs. catalysts of the invention.
Figure 6B:
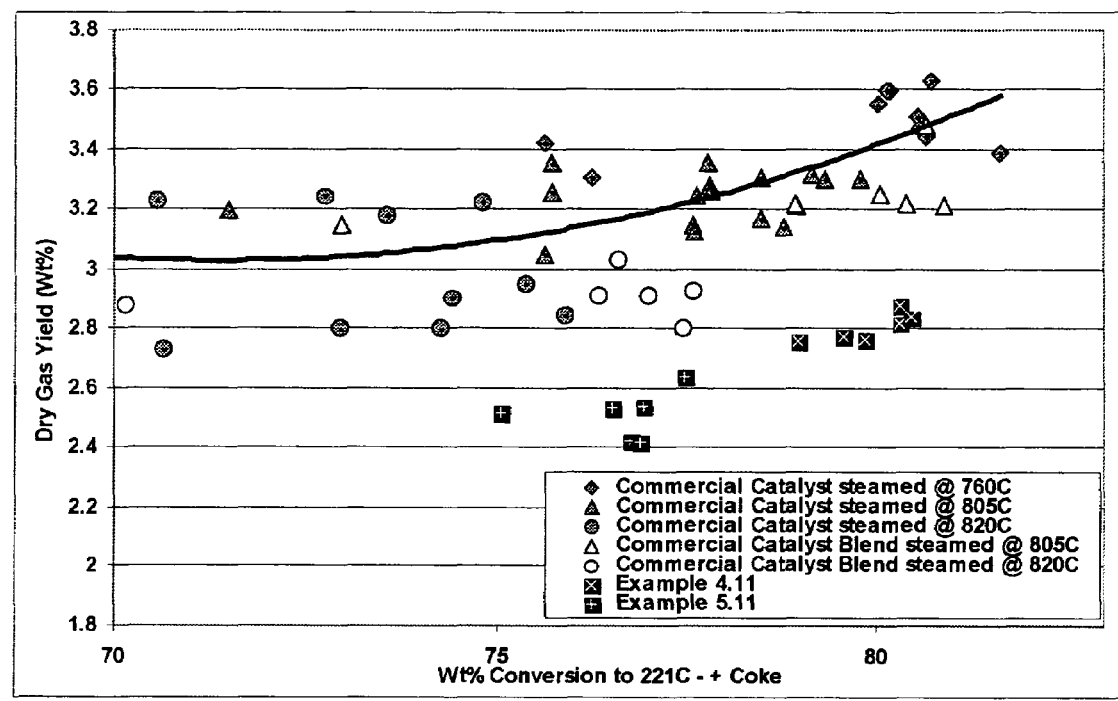
FIG. 6b is a plot showing a comparison of dry gas make vs. 221° C.-+ coke make for the commercially available catalysts vs. catalysts of the invention.

If light hydrocarbon moieties (such as methyl groups) associated with heavy polynuclear aromatics in coke are cracked off as a result high temperature, coke yields can fall while light gas yields rise. Since either coke or light gas can constrain unit operations, trading off coke for light gas is not a clear win. With the catalysts of this invention, it appears that both coke and light gas are lower than the base case comparative catalysts as shown in FIG. 6a which is a plot of dry gas make vs. 430° F.− (221° C.−)+coke make. FIG. 6b shows that the catalysts of this invention make less dry gas than commercially available state of the art catalysts.

Figure 7A:
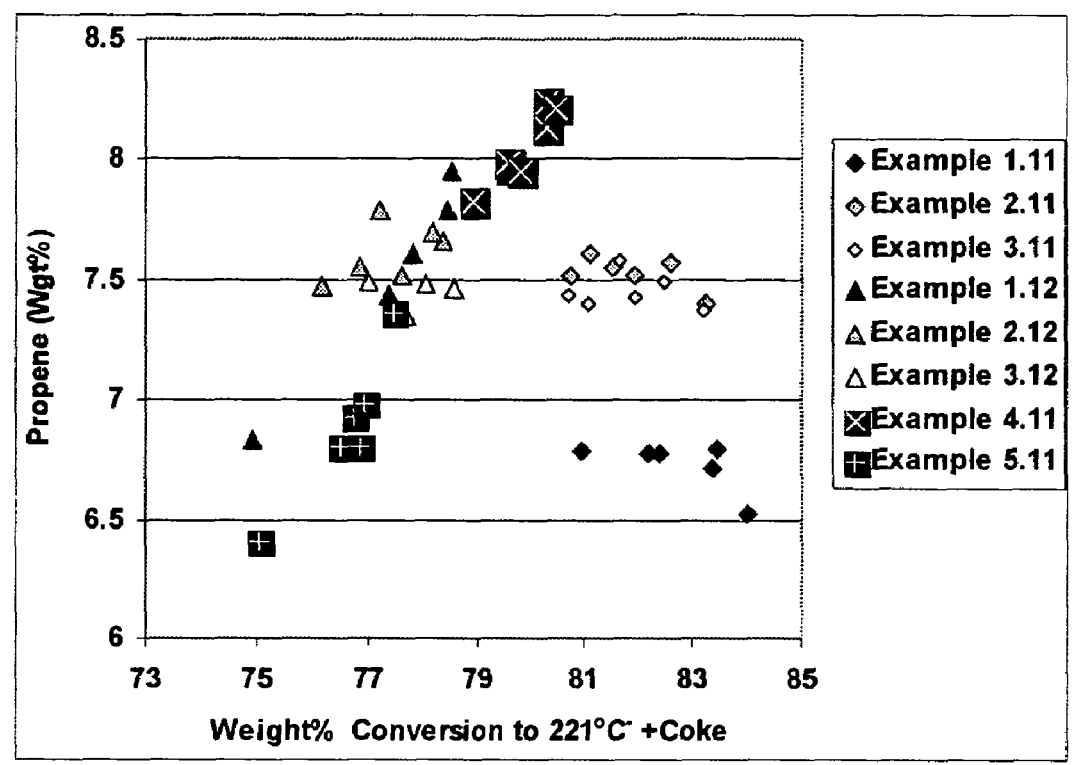
FIG. 7a is a plot showing a comparison of propene make vs. 221-° C.+ coke conversion for catalysts of the invention vs. base case comparative catalysts.
Figure 7B:
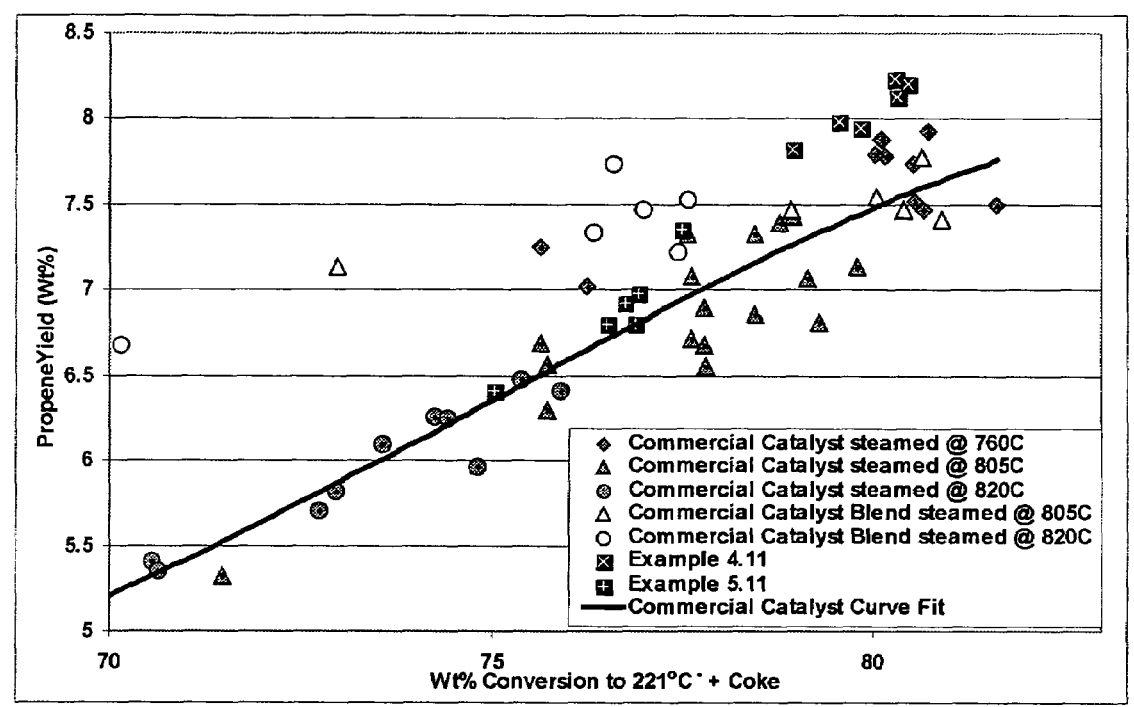
FIG. 7b is a plot showing a comparison of propene make vs. 221-° C.+ coke conversion for the commercially available catalysts vs. catalysts of the invention.

FIG. 7a shows that the catalysts of this invention make more valuable propene than do similar base case comparative catalysts when they achieve the same conversion. FIG. 7b shows that the catalysts of this invention make more propene than commercially available state of the art catalysts.

Figure 8A:
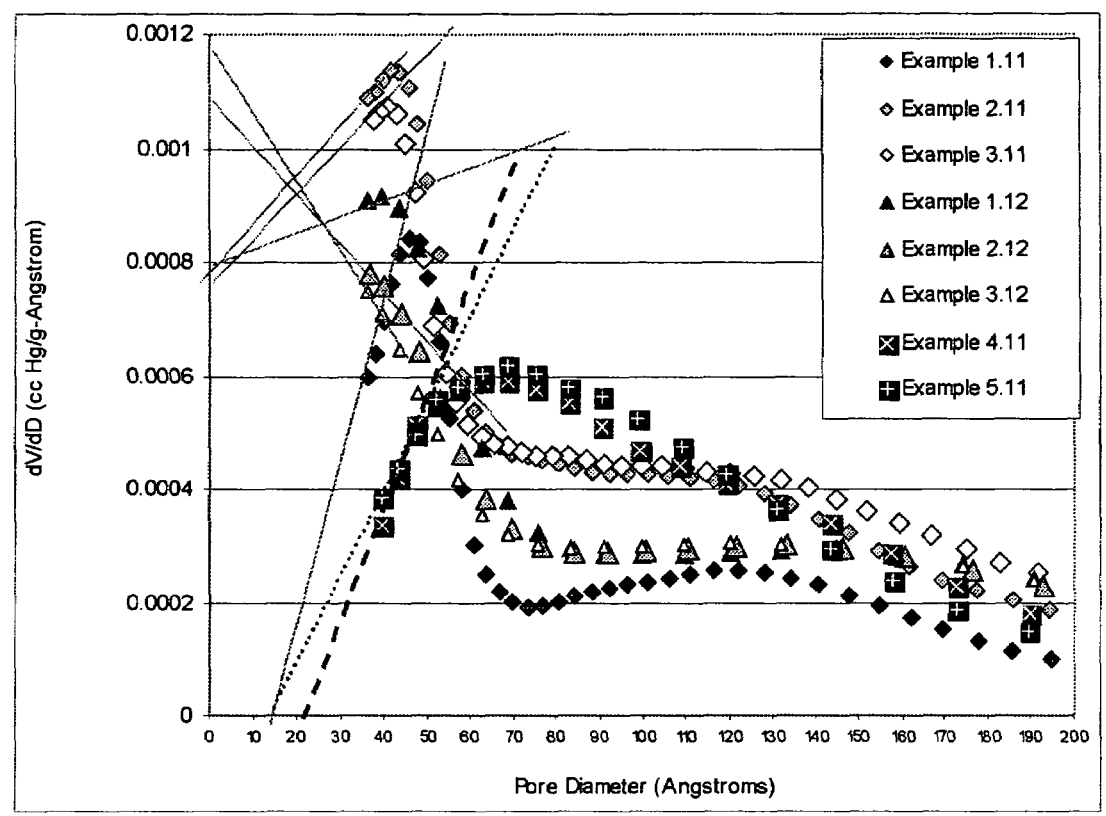
FIG. 8a is a plot of dV/dD vs. pore diameter showing that catalysts of the invention have a maximum occurring at pore diameters above 50 Angstroms.

FIG. 8a shows that the catalysts of this invention (Examples 4 and 5) differ from the similar base case comparative catalysts in that:

1. The maximum in the dV/dD vs. pore diameter plot occurs at pore diameter greater than 50 Angstroms for the catalysts of this invention.
2. The tangents to the dV/dD vs. pore diameter curves below 50 Angstroms for steamed catalysts of this invention are positive and intercept the pore diameter axis (dV/dD=0) at greater than 10 Angstroms.
3. The catalysts of this invention are made with sodium silicate, urea, and a sodium salt of phosphate as well as a faujasite and alumina.

Figure 8B:
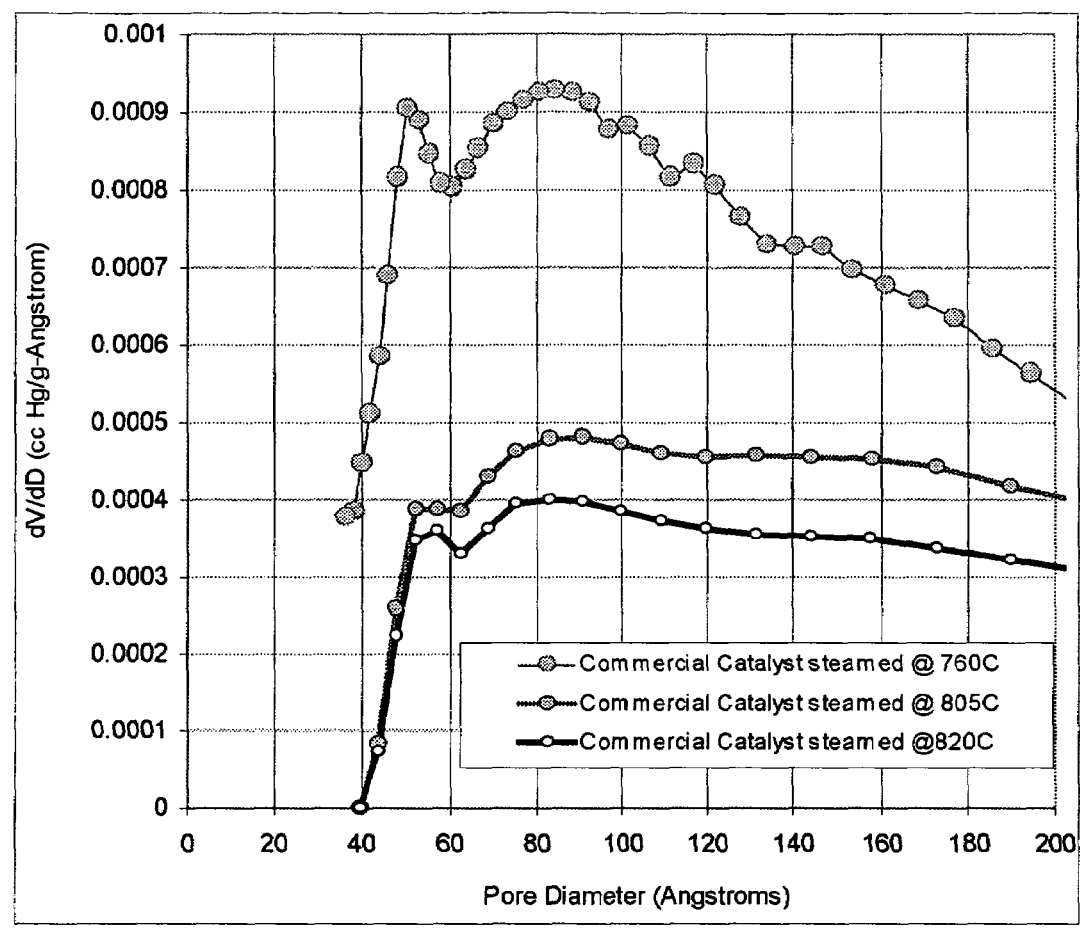
FIG. 8b is a plot of dV/dD vs. pore diameter showing that the commercially available catalysts have a local maximum in the dV/dD plot below 60 Angstroms regardless of the severity of the steaming.

FIG. 8b shows that the commercially available state of the art catalysts have a local maximum in the dV/dD plot below 60 Angstroms (about 50 Angstroms) regardless of the severity of the steaming, and that above 60 Angstroms, there may be more than one maximum in the 60 to 200 Angstrom range.

Figure 8C:
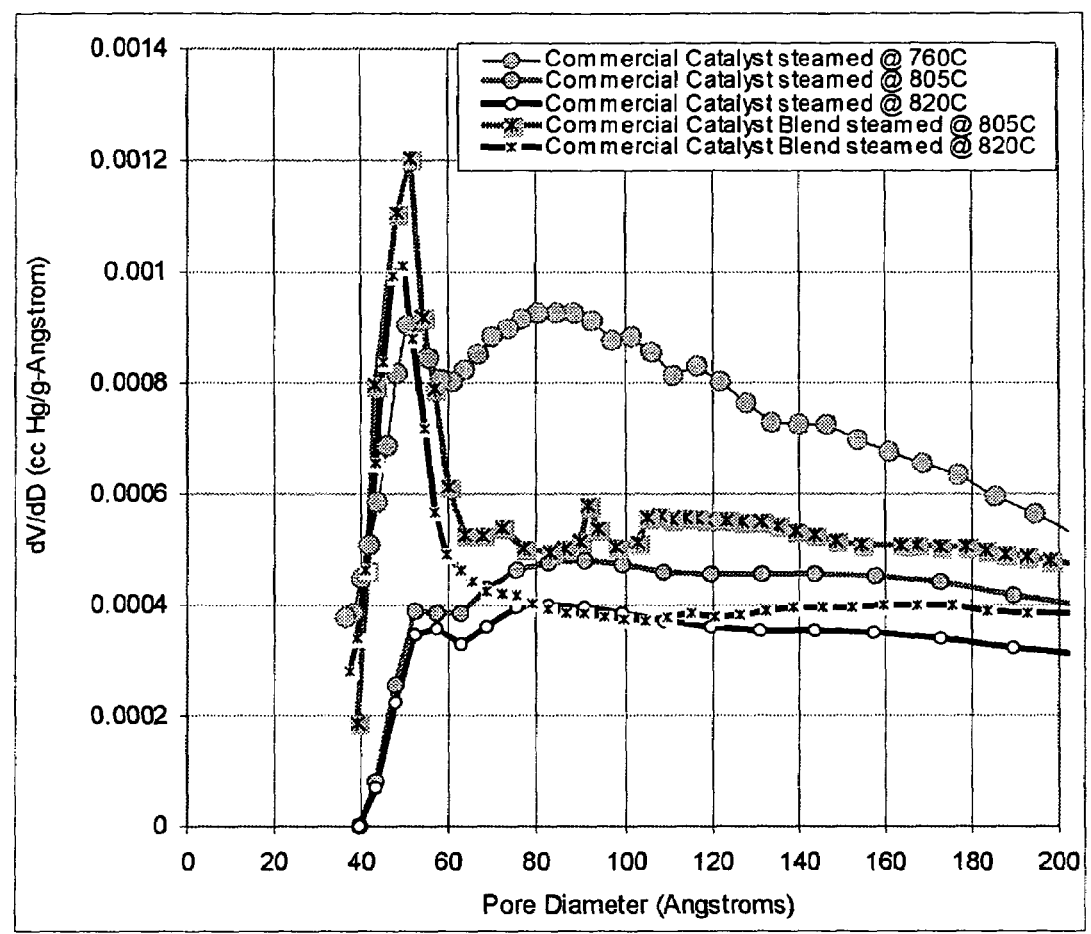
FIG. 8c is a plot of dV/dD vs. pore diameter showing that commercially available catalyst when blended with other commercially available catalysts from the same manufacturer has a local maximum in the dV/dD plot below 60 Angstroms regardless of the severity of the steaming.

FIG. 8c is a plot of dV/dD vs. pore diameter showing that commercially available state of the art catalysts when blended with other catalysts from the same manufacturer have a local maximum in the dV/dD plot below 60 Angstroms regardless of the severity of the steaming.

Figure 8D:
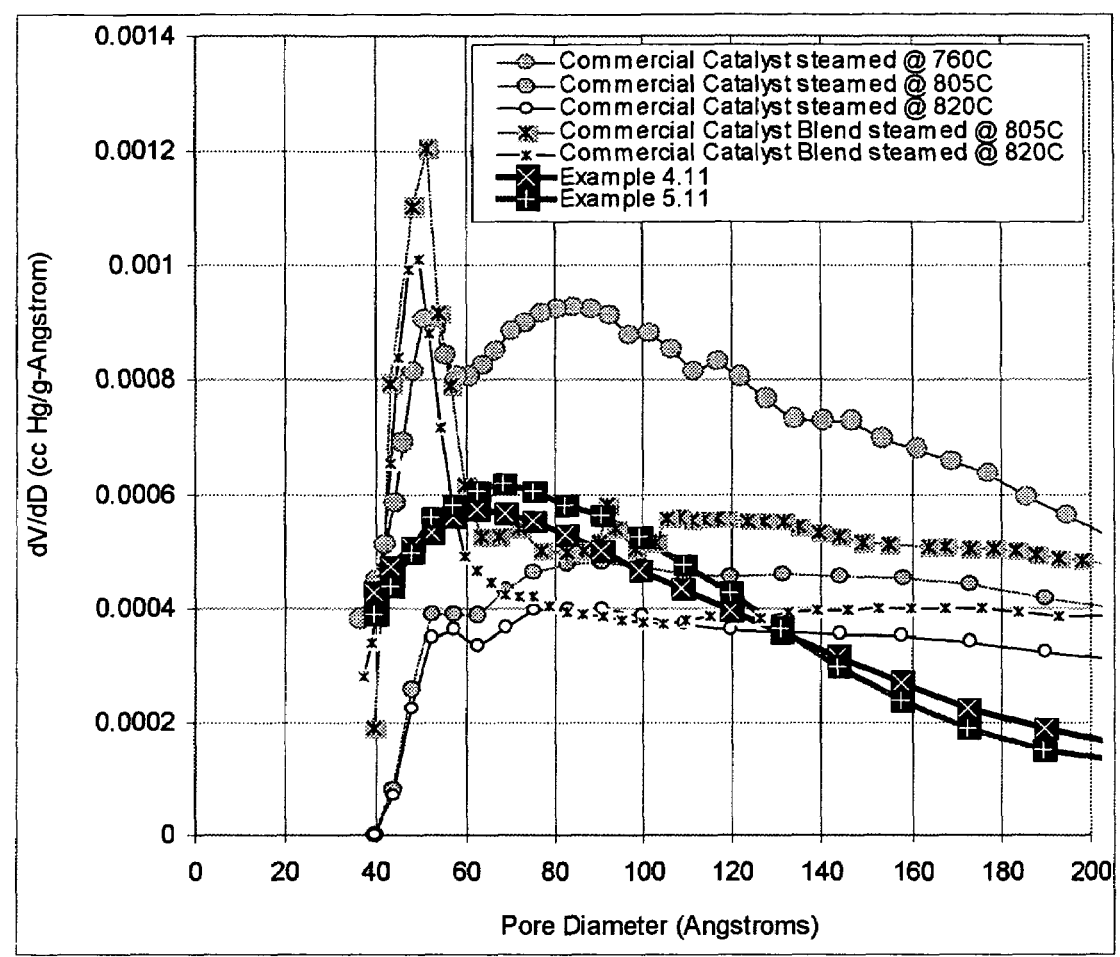
FIG. 8d is a plot of dV/dD vs. pore diameter showing that catalysts of this invention have a maximum in the dV/dD plot above 60 Angstroms and below 80 Angstroms unlike the commercially available catalysts which have a local maximum below 60 Angstroms in all cases and may have a local maximum above 80 Angstroms in some cases.

FIG. 8d is a plot of dV/dD vs. pore diameter showing that catalysts of this invention have a maximum in the dV/dD plot above 60 Angstroms and below 80 Angstrom unlike the commercially available state of the art catalysts which have a local maximum in the dV/dD plot below 60 Angstroms regardless of the severity of the steaming and may have one or more maxima above 80 Angstroms.

The invention claimed is:

1. A cracking catalyst composition, comprising:
    at least one amorphous, porous matrix, each matrix having pores ranging in diameter from about 1 Å to about 10 Å and pores ranging in diameter from about 40 Å to about 500 Å, substantially free of pores ranging in size from about 10 Å to about 40 Å, wherein in the pore range from 50 Å to 250 Å, there is a single maximum in differential pore volume distribution over the 50 Å to 250 Å range; and
    at least one molecular sieve;
    wherein the amorphous, porous matrix is comprised of at least one clay, gibbsite, and binder colloids.

2. The composition of claim 1 wherein an integrated maximum pore volume for matrix pores having a diameter between about 10 Å and about 40 Å is less than about 0.03 cc/g.

3. The composition of claim 1 wherein the matrix is a silica-alumina matrix.

4. The composition of claim 1 wherein the molecular sieve is a zeolite.

5. The composition of claim 4 wherein the zeolite is at least one of a large pore zeolite or shape-selective zeolite.

6. The composition of claim 1 wherein the clay is kaolin.

7. The composition of claim 1 wherein the binder colloid comprises alkaline silicate.

8. The composition of claim 7 wherein the alkaline silicate is sodium silicate.

9. The composition of claim 1 wherein the amount of matrix is from 5 to 100 wt. %, based on total, weight of catalyst.

10. The composition of claim 1 wherein an integrated maximum pore volume for a volume of matrix pores having a diameter between about 40 Å and about 500 Å ranges from about 0.06 cc/g to about 0.12 cc/g.

11. The composition of claim 5 wherein the large pore zeolite is zeolite Y or zeolites isostructural with zeolite Y.

12. The composition of claim 1 wherein the matrix is a single amorphous entity.

13. The composition of claim 1 wherein the matrix, is a blend of two or more individual amorphous matrices provided that each matrix individually meets the differential pore volume distribution requirement.

14. A method for making a cracking catalyst precursor comprising:
    (a) combining water, at least one molecular sieve, gibbsite, at least one clay, at least one urea compound having the formula

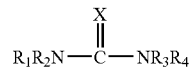

where $R_1$, $R_2$, $R_3$, and $R_4$ are individually H or $C_1$ to $C_4$ alkyl and X is sulfur or oxygen, and at least one phosphate to form a first mixture;
    (b) combining the first mixture with sufficient aqueous alkaline silicate solution to form a slurry having a pH sufficient to prevent gellation of the aqueous alkaline silicate solution;
    (c) drying the slurry at a drying temperature sufficient to remove water to form a first solid;
    d) combining the first solid with water and an ion exchange composition comprising at least one of mineral acid, aluminum salts of mineral acids, or salts of mineral acids, to form the catalyst precursor, the catalyst precursor being ion-exchanged and having a lower concentration of alkali metal compared to the first solid.

15. The method of claim 14 wherein the molecular sieve is a zeolite.

16. The method of claim 15 wherein the zeolite is at least one of a large pore zeolite or shape-selective zeolite.

17. The method of claim 14 wherein the clay is kaolin.

18. The method of claim 14 wherein the alkaline silicate is sodium silicate.

19. The method of claim 14 wherein in the urea compound, $R_1$, $R_2$, $R_3$, and $R_4$ are individually H and X is oxygen.

20. The method of claim 14 wherein the phosphate is at least one water soluble primary, secondary or tertiary phosphate salt.

21. The method of claim 14 wherein the phosphate is alkali metal phosphate.

22. The method of claim 21 wherein the alkali metal phosphate is sodium phosphate.

23. The method of claim 14 wherein the mineral acid is sulfuric acid.

24. The method of claim 14 wherein the aluminum salt of sulfuric acid is aluminum sulfate.

25. The method of claim 14 wherein the salt of mineral acid is at least one of aluminum sulfate or ammonium sulfate.

26. The method of claim 25 wherein the salt of mineral acid is a mixture of aluminum sulfate and ammonium sulfate.

27. The method of claim 14 wherein the first solid comprises ammonium silicate, alkali silicate and alkali carbonate, urea compound, clay, gibbsite and molecular sieve.

28. The method of claim 15 wherein the zeolite is isostructural to zeolite Y.

29. A method for making a cracking catalyst which comprises:
    (a) combining water, at least one molecular sieve, gibbsite, at least one clay, at least one urea compound having the formula

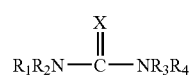

where $R_1$, $R_2$, $R_3$, and $R_4$ are individually H or $C_1$ to $C_4$ alkyl and X is sulfur or oxygen, and at least one phosphate to form a first mixture;

(b) combining the first mixture with sufficient aqueous alkaline silicate solution to form a slurry having a pH sufficient to prevent gellation of the aqueous alkaline silicate solution;

(c) drying the slurry at a drying temperature sufficient to remove water to form a first solid;

(d) combining the first solid with water and an ion exchange composition comprising at least one of mineral acid, aluminum salts of mineral acids, or salts of mineral acids, to form an ion-exchanged catalyst precursor, the ion-exchanged catalyst precursor having a lower concentration of alkali metal compared to the first solid;

(e) calcining the ion-exchanged catalyst precursor at a temperature ranging from about 250° C. to about 850° C. for a calcination time to make a calcined, ion-exchanged catalyst precursor; and (f) contacting the calcined, ion-exchanged catalyst precursor with steam at a temperature ranging from about 650° C. to about 850° C. for a steaming time in order to make the cracking catalyst.

30. The method of claim 29 wherein the molecular sieve is a zeolite.

31. The method of claim 30 wherein the zeolite is at least one of a large pore zeolite or shape-selective zeolite.

32. The method of claim 29 wherein the clay is kaolin.

33. The method of claim 29 wherein in the urea compound, $R_1$, $R_2$, $R_3$, and $R_4$ are individually H and X is oxygen.

34. The method of claim 29 wherein the phosphate is at least one water soluble primary, secondary or tertiary phosphate, pyrophosphate or polyphosphate salt.

35. The method of claim 29 wherein the phosphate is alkali metal phosphate.

36. The method of claim 35 wherein the alkali metal phosphate is sodium phosphate.

37. The method of claim 29 wherein the mineral acid is sulfuric acid.

38. The method of claim 29 wherein the aluminum salt of sulfuric acid is aluminum sulfate.

39. The method of claim 29 wherein the salt of mineral acid is aluminum sulfate.

40. The method of claim 29 wherein the salt of mineral acid is at least one of aluminum sulfate or ammonium sulfate.

41. The method of claim 40 wherein the salt of mineral acid is a mixture of aluminum sulfate and ammonium sulfate.

42. The method of claim 29 wherein the first solid comprises ammonium silicate, alkali silicate and alkali carbonate, urea compound, clay, gibbsite and molecular sieve.

43. The method of claim 29 wherein the steaming time is about 4 to about 48 hours.

44. The method of claim 29 wherein the alkaline silicate is sodium silicate.

45. The method of claim 29 wherein the ion-exchanged catalyst precursor from step (d) is combined with water and a second, independently selected ion exchange composition comprising at least one of sulfuric acid, aluminum sulfate, and ammonium sulfate, to form a second ion-exchanged catalyst precursor having a lower concentration of alkali metal compared to the first solid and first ion-exchanged catalyst precursor.

46. The composition of claim 1 made by a process which comprises:

(a) combining water, gibbsite, at least one clay, at least one urea compound having the formula

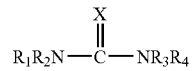

where $R_1$, $R_2$, $R_3$, and $R_4$ are individually H or $C_1$ to $C_4$ alkyl and X is sulfur or oxygen, and at least one phosphate to form a first mixture;

(b) combining the first mixture with sufficient aqueous alkaline silicate solution to form a slurry having a pH sufficient to prevent gellation of the aqueous alkaline silicate solution;

(c) drying the slurry at a drying temperature sufficient to remove water to form a first solid; and (d) combining the first solid with water and an ion exchange composition comprising at least one of mineral acid, aluminum salts of mineral acids, or salts of mineral acids, to form the matrix.

47. The composition of claim 46 wherein the matrix is calcined.

* * * * *